(12) United States Patent
Hasegawa et al.

(10) Patent No.: US 6,370,587 B1
(45) Date of Patent: Apr. 9, 2002

(54) NETWORK INTERCONNECTION DEVICE

(75) Inventors: Tetsuo Hasegawa, Tokyo; Shuhei Kotoya, Niza, both of (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/235,287

(22) Filed: Jan. 22, 1999

(30) Foreign Application Priority Data

Jan. 23, 1998 (JP) .......................................... 10-026761

(51) Int. Cl.[7] .............................................. G06F 15/16
(52) U.S. Cl. ...................................... 709/245; 709/235
(58) Field of Search .................................. 709/245, 238

(56) References Cited

U.S. PATENT DOCUMENTS 6,173,334 B1 * 1/2001 Matsuzaki et al. ........... 709/245
6,230,189 B1 * 5/2001 Sato et al. ................... 709/206

OTHER PUBLICATIONS

C. Hedrick; Rutgers University; Network Working Group; "Routing Information Protocol"; RFC 1058; Jun. 1988; pp. 1–17.
Echelon Corp.; LoneTalk Protocol Specification, Version 3.0; 078–0125–01A; 1994; pp. 1–112.
CORBA Services: Common Object Services Specification; OMG Group; Dec. 2, 1997 "Event Service Specification", Chapter 4; Mar. 1995; pp. 4–1 to 4–34.

* cited by examiner

*Primary Examiner*—David Y. Eng
(74) *Attorney, Agent, or Firm*—Banner & Witcoff, Ltd.

(57) ABSTRACT

A network interconnection device connected between at least two types of networks of different protocol in a network system is disclosed. The network interconnection device comprises a table stores plural transfer address data for each address data of a message, an interface, upon receipt of a message, transfers the message to plural destinations with reference to the table. The table stores a plurality of transfer address data corresponding to each one of the destination data.

18 Claims, 21 Drawing Sheets

| EVENT PROCESSOR'S ADDRESS | LAST TRANSMISSION TIME | LAST RECEPTION TIME |
|---|---|---|
| 136.22.7 | 15:10:20 | 15:10:20 |
| 136.25.43 | 15:10:00 | 15:10:25 |
| 136.24.87 | 15:10:21 | 15:10:21 |
| 125.35.1 | 15:10:58 | 15:08:25 |
| 136.22.76 | 15:10:48 | 15:10:48 |
| 135.24.59 | 15:10:00 | 15:09:57 |
|  |  |  |

FIG. 21

| EVENT PROCESSOR'S ADDRESS | LAST TRANSMISSION TIME | LAST RECEPTION TIME |
| --- | --- | --- |
| 136.22.7 | 15:10:20 | 15:10:20 |
| 136.25.43 | 15:10:00 | 15:10:25 |
| 136.24.87 | 15:10:21 | 15:10:21 |
| 136.22.76 | 15:10:48 | 15:10:48 |
| 135.24.59 | 15:10:00 | 15:09:57 |
|  |  |  |
|  |  |  |

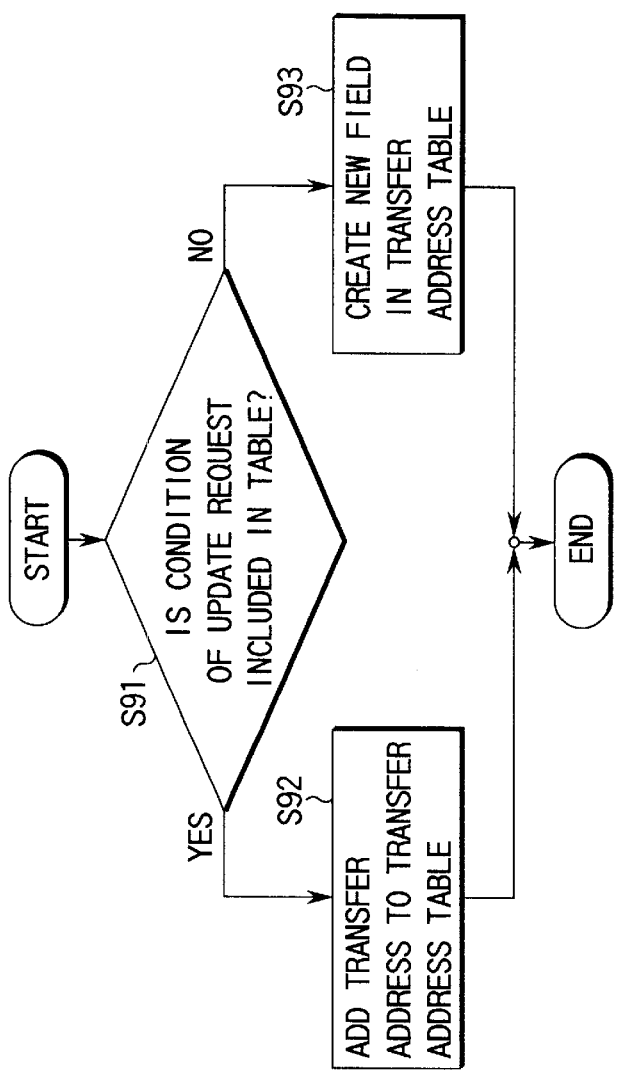

NETWORK INTERCONNECTION DEVICE

BACKGROUND OF THE INVENTION

The present invention relates to a network interconnection device for interconnect networks of different types or different protocol, and more in particular to a network interconnection device for (i) interconnecting a plurality of the same type of networks through a different type of network to communicate a message from a terminal of a type of network through a different type of network to the terminal of the same type of network, or (ii) communicating a message from a terminal of a type of network to a terminal of a different type of network.

The application is based on Japanese Patent Application No. 10-26761, filed Jan. 23, 1998, the content of which is incorporated herein by reference.

In this network interconnection device, a message in a network of a control system is sent to a network of another control system through an internet or an intranet, or to an device connected to an internet or an intranet, for example, in an environment comprising a plurality of control system networks are connected to each other by an internet or an intranet. This network interconnection device includes a router for sending a message communicated in a given network to a destination through another network of the same type, a gateway for sending a message to a destination through a different type of network, or an event processing device for sending not a data but an event through a network to a destination.

FIG. 1 shows a conventional system for interconnecting different types of network by a router. Consider the case where a message is sent from a node ND1 in a network LAN1 having a first structure (address structure, message format structure, etc.) through a network INET of a second structure to a node ND2 in another network LAN 2 of the first structure. A router α is connected to the network LAN1 of the first structure that has received the message and the network INET of the second structure has a node ND2 as a message destination in another network LAN2 of the first structure. If the router a determines that the destination of the message is the node ND2, it cannot transmit the message through the network INET of the second structure as it is. Therefore, the router α transforms the message to suit the network INET of the second structure (by adding an address of a router β expressed by the second structure or transforming the communication protocol), so that this message can be sent to the router β connected to another network LAN2 of the first structure and the network INET of the second structure. The router β retransform the received message into a form suiting the network LAN of the first structure (by deleting the address of the router β of the second structure or inversely transforming the communication protocol). In this way, the message is sent to the intended destination address (ND2).

Specifically, it is assumed that a control network LON (which is based on LonTalk protocol, LON and LonTalk are registered trademarks of Echelon corporation) is constructed in a factory A as a network LAN1 of the first structure, and another control network LON is constructed in a factory B distant from the factory A. It is desired to exchange data between the control networks LONs of the factories A and B through another type of network such as an internet or an intranet connected thereto.

The problem of this system is that the node ND3 of the network INET of the second structure or a plurality of nodes (in whichever of the networks) including the original destination node cannot receive the message. This is because that each network (the control network LON, for example) controls the nodes associated with it but does not control the nodes associated with other types of network, and therefore a destination cannot be specified. In recent years, demand has grown that control networks LON confined in respective floors of a building be connected to each other through an intranet or an internet or that control networks LON installed separately in distant factories be connected for transmission by an intranet or an internet. Further, demand is rising that the data exchanged in this way between the terminals of the networks be sent/received and managed at the terminals of an administration division of the head office through an intranet or an internet. The resulting demand is for sending a message to or receiving a message from a terminal of a different type of network without being conscious of the difference of network type.

BRIEF SUMMARY OF THE INVENTION

Accordingly, it is an object of the present invention to provide a network interconnection device for a network system including different types of networks, wherein a message can be sent to a plurality of terminals of a different type of network and/or the same type of network through a different type of network from a terminal of a given type of network.

A related object of the present invention is to provide a network interconnection device for permitting sending a message from a terminal of a given type of network to a terminal of a different type of network in a network system including different types of networks.

According to a first aspect of the invention, there is provided a network interconnection device connected to first and second networks, comprising:

a transfer address table for storing a plurality of transfer addresses of the structure of the second network for each message of the first network; and an address converter for changing the address of a message received from the first network, which address is the address of the structure of the first network, on the basis of the transfer address table, and sending the message to the second network.

The first aspect of the invention permits one-to-multiple address conversion between different types of networks.

According to a second aspect of the invention, there is provided a network interconnection device connected to first and second networks, comprising:

an event table for storing an event identifier for each message of the first network;

a message/event converter for converting a message received from the first network to an event based on the event table; and an address converter which, upon receipt of an event from the message/event converter, changes the address of a message corresponding to the event, which address is the address of the structure of the first network, to the address of the structure of the second network and sends the event to the resulting address of the second network.

The second aspect of the invention permits communication of a message between different types of networks by an event which is not dependent on the network structure, and realizes a multipurpose message conversion.

According to a third aspect of the invention, there is provided a network interconnection device connected to first and second networks, comprising:

an event table for storing an event identifier for each message of the first network;

a message/event converter for converting the message received from the first network in to an event based on the event table, the converter outputting an event with an event identifier attached thereto; and means for reading an address from the address table based on an event identifier upon receipt of the event from the message/event converter and changing the address of the message corresponding to the event, which is a system address of the first network, to the address read.

The third aspect can determine the destination based on an event identifier and increase the processing speed.

According to a fourth aspect of the invention, there is provided a network interconnection device for interconnecting first and second networks of a network system, comprising:

a transfer address table for storing a plurality of transfer addresses constituting the addresses of the structure of the second network for each message in the first network;

an address converter for changing the address of a message received from the first network constituting an address of the structure of the first network based on the transfer address table and sending the message to the second network;

a time table for storing the last time point when a message is received from each of other network interconnection devices and the last time point when the message is sent to each of other network interconnection devices;

an alive notification section for sending an alive notice to other network interconnection devices connected to the network that has not sent a message for at least a first predetermined time length based on the time table and updating the last time point of transmission in the time table to the present time; and an address table update section for detecting other network interconnection devices that have not sent a message for at least a second predetermined time length based on the time table, and deleting the transfer address corresponding to the network interconnection device detected from the transfer address table.

The fourth aspect deletes the network interconnection device as a destination that has not sent a message for a predetermined time length and prevents wasteful transfer, and therefore the load of the network is reduced for an improved efficiency.

According to a fifth aspect of the invention, there is provided a network interconnection device for interconnecting first and second networks of a network system, comprising:

a transfer address table for storing a plurality of transfer addresses constituting the addresses of the structure of the second network for each message of the first network;

an address converter for changing the address of a message constituting an address of the structure of the second network for each message, which address is received from the first network, based on the transfer address table and sending a message to the second network;

an update request section for sending an addition request for registering a set of a desired message and its own address in other network interconnection devices as a transfer address; and an update section for adding an address of other network interconnection devices to the transfer address table upon receipt of the addition request from the other network interconnection devices.

The fifth aspect automatically updates the transfer address table of each network interconnection device newly connected or reconnected to a network.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 21 shows contents of the last transmission and reception time table after the delete operation according to the seventh embodiment;

FIG. 25 is a flowchart showing the update operation of the update notification section according to the eighth embodiment; and FIG. 26 is a diagram showing an example of the update request message according to the eighth embodiment.

DETAILED DESCRIPTION OF THE INVENTION

A preferred embodiment of a network interconnection device according to the present invention will now be described with reference to the accompanying drawings.

First Embodiment

Figure 1:
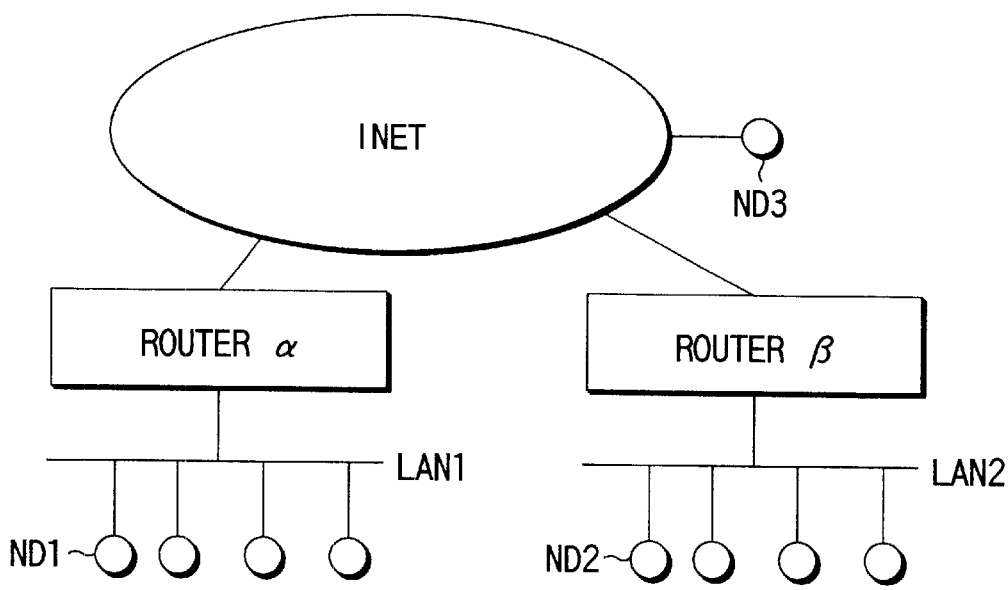
FIG. 1 is a diagram showing an example of a prior network system including a plurality of different types of network connected to each other.
Figure 2:
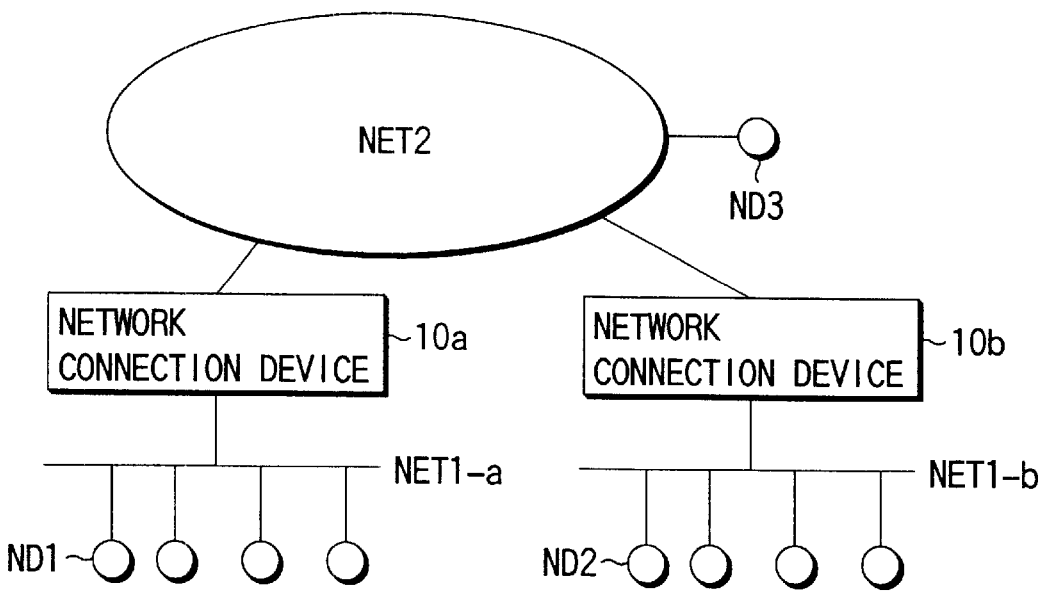
FIG. 2 is a diagram showing a network system in which different types of network are connected using a network interconnection device according to this invention.

FIG. 2 is a diagram schematically showing a configuration of the whole network system including network interconnection devices according to the present invention. In this system, a second-type network NET2 and a plurality of first-type networks NET1-*a* and NET1-*b* are connected to each other through network interconnection devices 10*a* and 10*b*. The first-type networks NET1-*a* and NET1-*b* include, for example, a control network LON, an IEEE 1394 or an Ethernet, while the second-type network NET2 constitutes an internet or an intranet.

Assume that a message having an address not included in the addresses of any terminal of the first-type network NET1-*a* is sent out from the node ND1 of the first-type network NET1-*a*. The network interconnection device 10*a* processes the message (by adding an address of the second-type network NET2 or transforming the communication protocol) into a form suiting the structure of the second-type network NET2 in order to transfer the message through the second-type network NET2 to the network having the terminal of the address as determined from the destination of the message, and then sends the message to the second-type network NET2. Assume, on the other hand, that the network interconnection device 10*a* receives from the second-type network NET2 a message having an address of a terminal included in the first-type network NET1-*a* to which the network interconnection device 10*a* belongs. Then, the message that has been processed into a form suiting the structure of the second-type network NET2 is reprocessed into a form suiting the structure of the first-type network NET1-*a* (by removing the address of the second-type network NET2 or inversely transforming the communication protocol), and sent out to the first-type network NET1-*a*.

Similarly, assume that a message having an address not included in the addresses of the terminals of the first-type network NET1-*b* is sent out from a node of the first-type network NET1-*b*. The network interconnection device 10*b* processes the message into a form suiting the structure of the second-type network NET2 in order to transfer the message through the second-type network NET2 to the network having the terminal of the address of the message as determined from the destination thereof, and sends the message to the second-type network NET2. On the other hand, assume that the network interconnection device 10*b* has received from the second-type network NET2 a message having an address of a terminal of the first-type network NET1-*b* to which the first-type network interconnection device 10*b* belongs. The message that has been processed into a form suiting the structure of the first-type network NET1-*b* is reprocessed into a form suiting the structure of the first-type network NET1-*b* and sent out to the first-type network NET1-*b*.

The first embodiment provides a network interconnection device, in which a transfer address table for changing the address is prepared and a plurality of destinations, (addresses of different types of networks) are registered in the table beforehand. In this way, a message with a single address can be transferred to a plurality of different addresses registered in the table (transfer address table).

Figure 3:
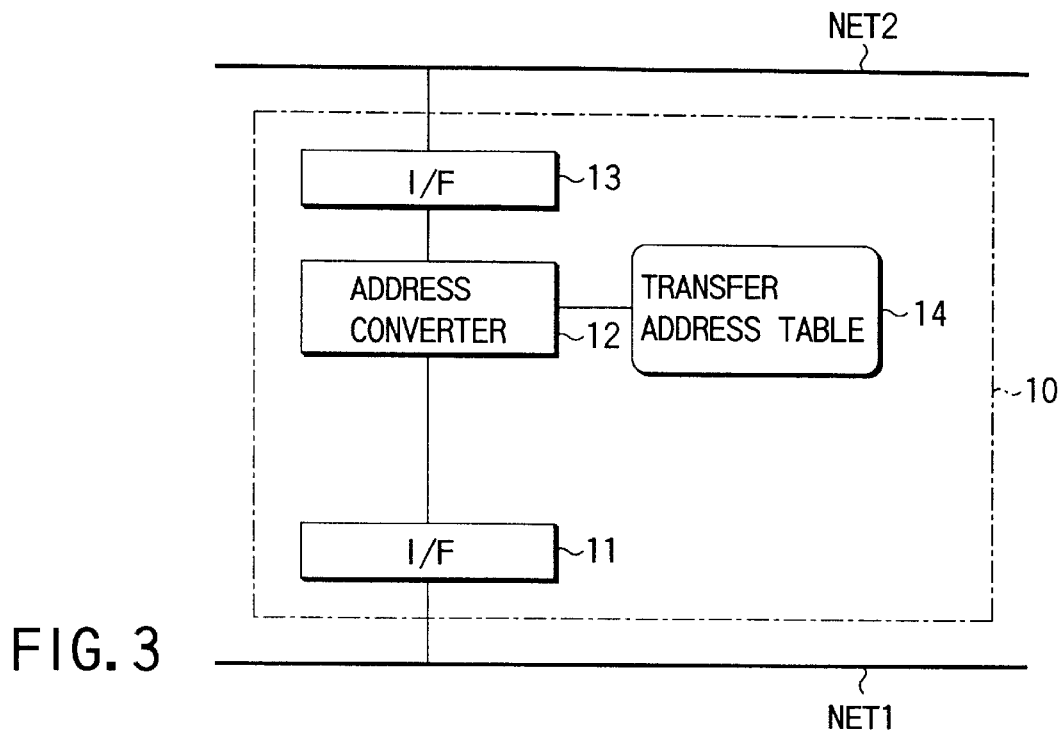
FIG. 3 is a block diagram showing a network interconnection device according to a first embodiment of the invention.

FIG. 3 is a block diagram showing an example configuration of the network interconnection device 10 (10*a* and 10*b* of FIG. 2) according to the first embodiment.

The message network interconnection device 10 interconnecting the first network NET1 (NET1-*a* and NET1-*b* of FIG. 2) and the second network NET2 comprises a first interface (I/F) 11, an address converter 12, a second interface 13 and a transfer address table 14.

The first interface 11 is for communication with the first-type network NET1, and the transfer address table 14 is for registering a list of the original destination addresses and the transfer addresses (addresses of the network interconnection device 10) corresponding to the original destination addresses. The transfer address table 14 is realized by a programmable nonvolatile memory such as a flush memory.

The address converter (or translator) 12 has dual function. In the first function, upon receipt of a message from the first network NET1 through the first interface 11, searches the transfer address table 14 for an address corresponding to the address included in the message. A corresponding address, if any, is read from the transfer address list, and the message is processed (by adding a transfer address to the message containing the original destination address) into a form for the second network NET2. Then, a transmission request is issued together with this message to the second interface 13 connected to the second network NET2. In the second function, upon receipt of a message from the second network NET2 through the second interface 13, the message for the second network NET2 thus received is processed (by removing the transfer address of NET2 and reproducing a message including the original destination address) into a message for the first network NET1, and a transmission request is issued together with the processed message to the first interface 11 connected to the first network NET1.

The second interface 13, which is for communication with the second network NET2, also has dual function. The first function is such that upon receipt of a transmission request from the address converter 12, a processed message delivered from the address converter 12 is sent to the second network NET2. The second interface 13 has such a second function that a message for the second network NET2, upon receipt thereof, is delivered to the address converter 12.

Figure 5:
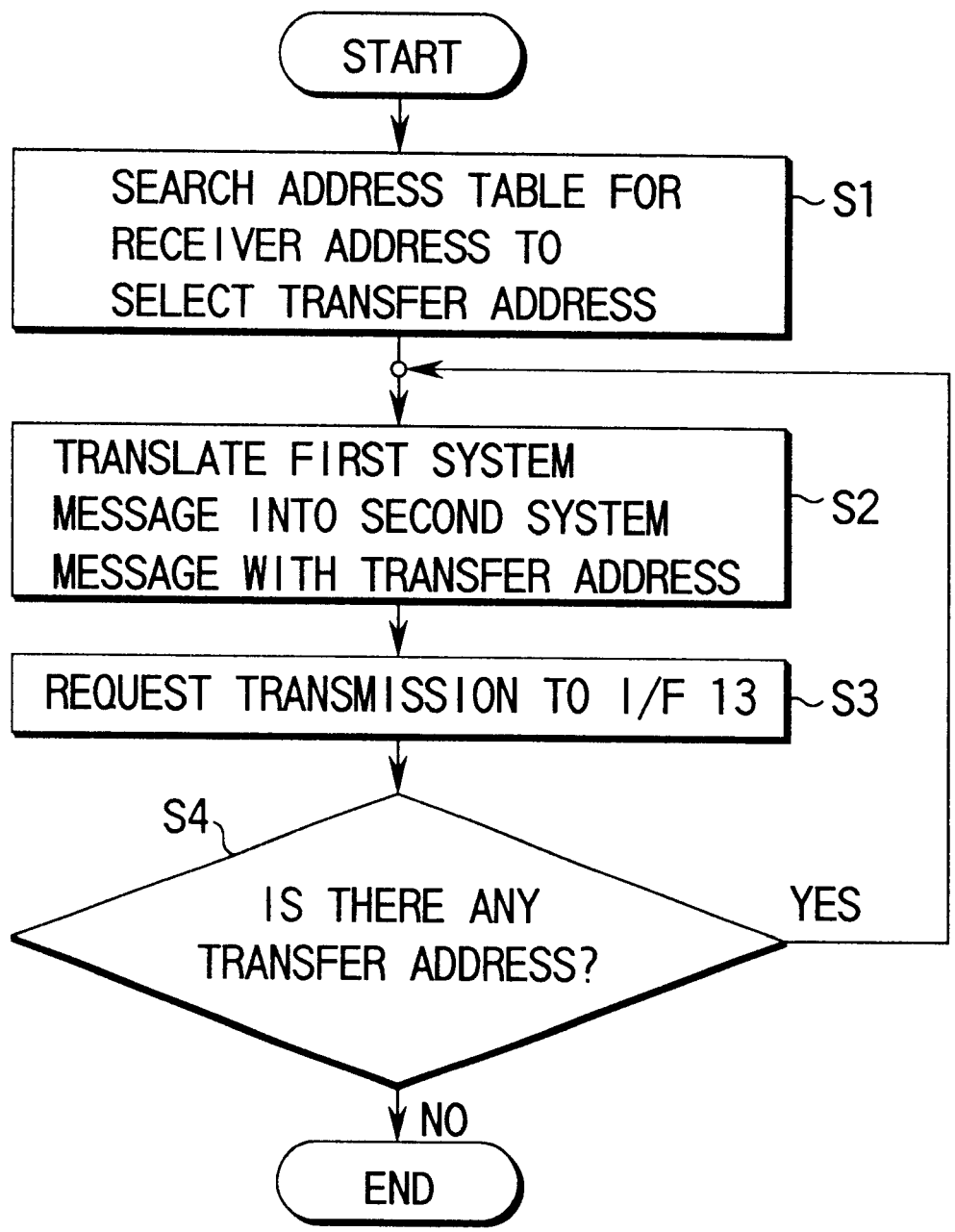
FIG. 5 is a flowchart showing the operation of the first embodiment.

The operation of the network interconnection device of FIG. 3 will be explained with reference to the flowchart of FIG. 5. Assume that the first interface 11 connected to the first network NET1 has received a message to address "205" (which is an address of the node ND2 of the network NET1-b). The first interface 11 delivers the message to the address converter 12, which in turn performs the following operation in accordance with the flow shown in FIG. 5.

Figure 4:
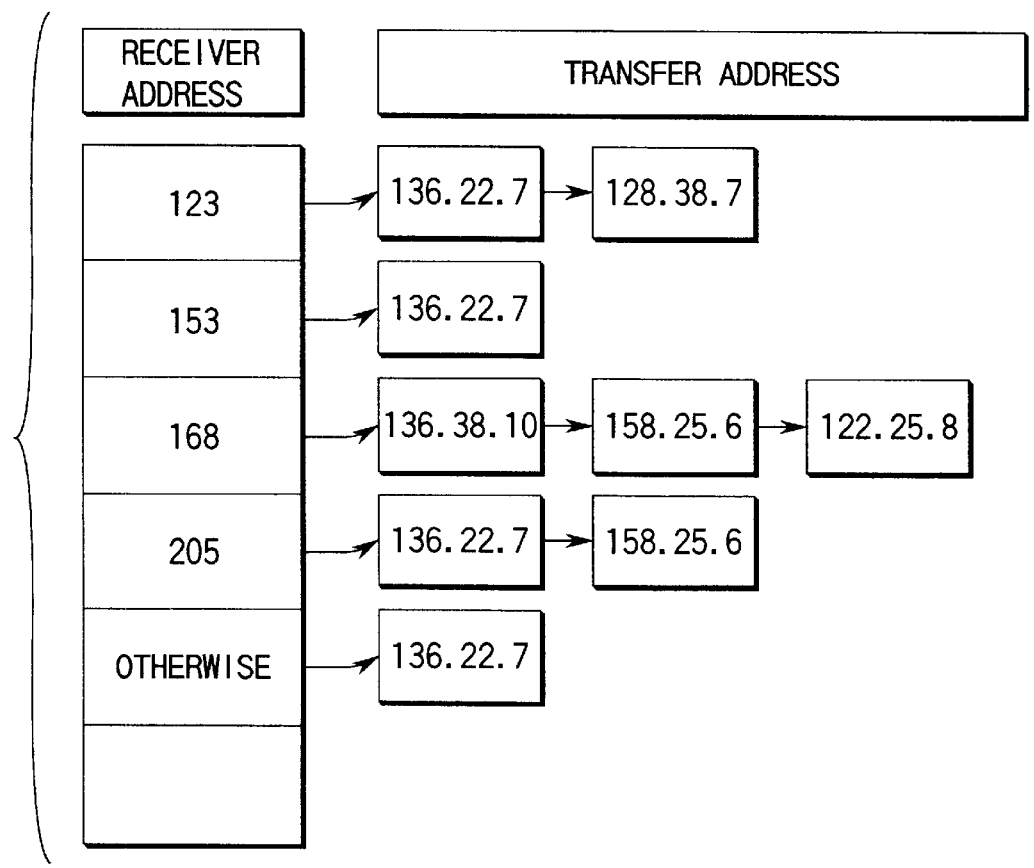
FIG. 4 shows a transfer address table according to the first embodiment.

In step S1, the transfer address table 14 of FIG. 4 is searched for a field with the destination address "205" and a transfer address list of the corresponding field. In the absence of such an address, an "otherwise" field is selected. In the case where the destination address is "205", the corresponding transfer address is "136.22.7" (this is the address of the network interconnection device 10b). In step S2, therefore, the address converter 12 prepares a message for the second network NET2 with a destination address "136.22.7". In step S3, the message thus prepared is sent together with a transmission request to the second interface 13 connected to the second network NET2.

As a result, the second interface 13 sends the message for the second network NET2 received from the address converter 12 to the second network NET2.

Upon completion of this process, the address converter 12 determines whether there still remains a transfer address not yet sent in step S4, and if any, the above-mentioned operation is repeated, while in the absence of such a transfer address, the process ends.

In this case, the field of destination address "205" in the transfer address table 14 of FIG. 4 also has a transfer address "158.25.6" in addition to the transfer address "136.22.7" mentioned above. Therefore, a message for the second network NET2 with this address is prepared (step S2), and this message, together with a transmission request, is sent to the second interface 13 (step S3).

As a result, the second interface 13 sends the message for the second network NET2 received from the address converter 12 to the second network NET2.

Thus, the message for the network address "205" of the first network NET1 can be transferred to two different destinations, that is, network interconnection devices with addresses "136.22.7" and "158.25.6".

After a message has been sent to the network interconnection device, the address for the second network NET2 is deleted from the message and the original message (including the message body and the address for the first network NET1) is reproduced.

As explained above, according to the first embodiment, an address table for changing the address is prepared, and a plurality of destinations are registered in this address table beforehand. As a result, a message originally having a single address can be transferred to the two different destinations registered in the address table. Also, communication between different types of networks becomes possible by setting a node of the network structure of a different type from the original destination address. Further, it is also possible to include the address of the node ND3 connected to the second network NET2, for example, as a predetermined address constituting a transfer address in the transfer address table, so that all the messages flowing in the second network can be monitored by the node ND3.

Other embodiments of the network interconnecting device according to the present invention will be described. The same portions as those of the first embodiment will be indicated in the same reference numerals and their detailed description will be omitted. The general configuration of the other embodiments is similar to that of the first embodiment shown in FIG. 2.

Second Embodiment

In the first embodiment, the transfer address is determined based on the destination of the message alone. According to the second embodiment, however, a network interconnection device is explained in which the transfer address is determined from the source address or the contents of the message data or a combination thereof and a message can be transferred to a plurality of points in a network of a different type.

Figure 6:
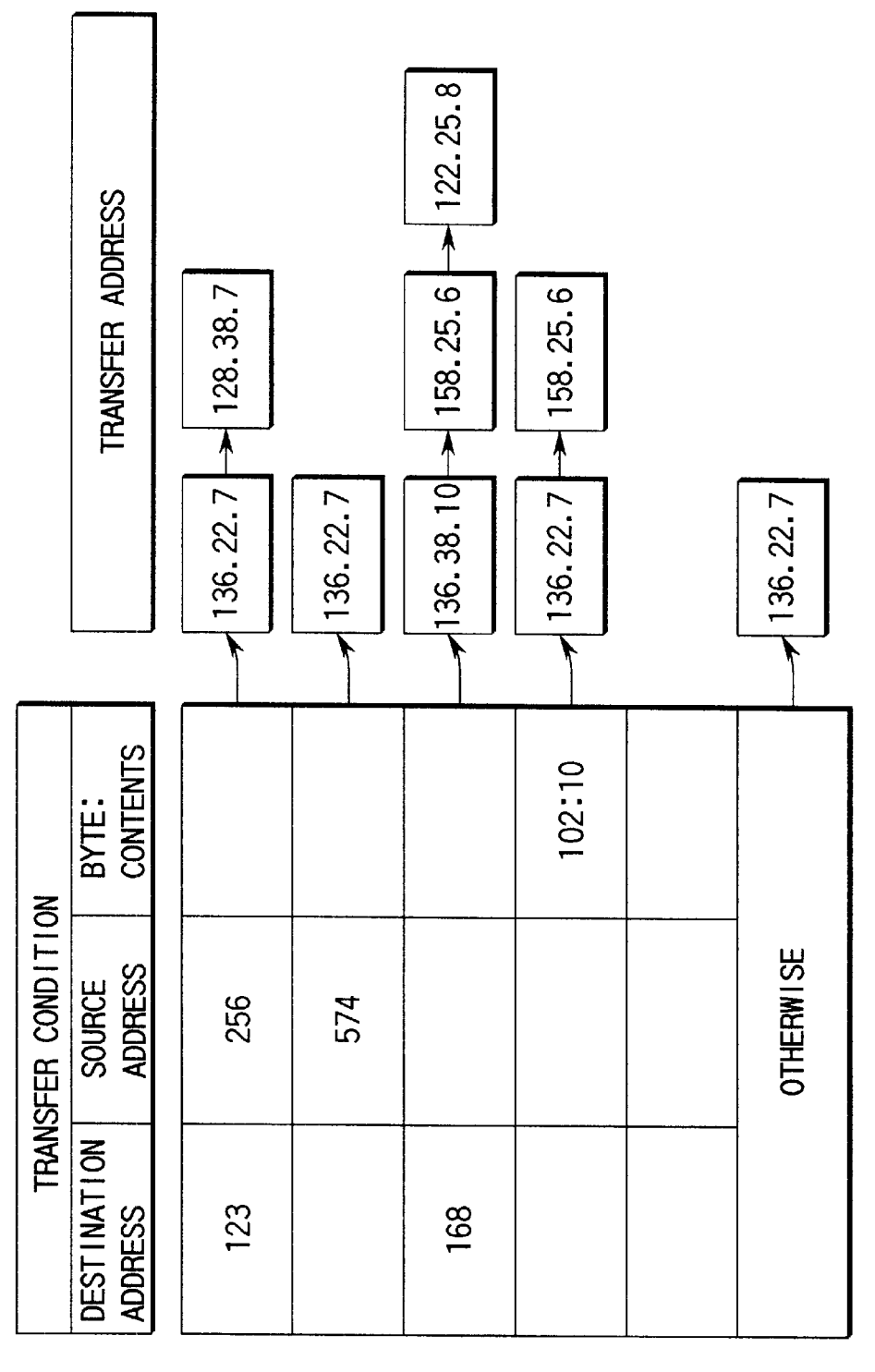
FIG. 6 shows another example of a transfer address table for a network interconnection device according to the first embodiment.

The configuration of the network interconnection device is the same as that of the first embodiment shown in FIG. 3, except that the contents of the transfer address table 14 are different from those of the first embodiment. The contents of the address table according to the second embodiment are shown in FIG. 6. The transfer address table 14 defines the transfer addresses for each transfer condition including the OR logic of the destination address, the source address, and the byte (data position) and contents. The OR logic can be replaced with the AND logic.

Figure 7:
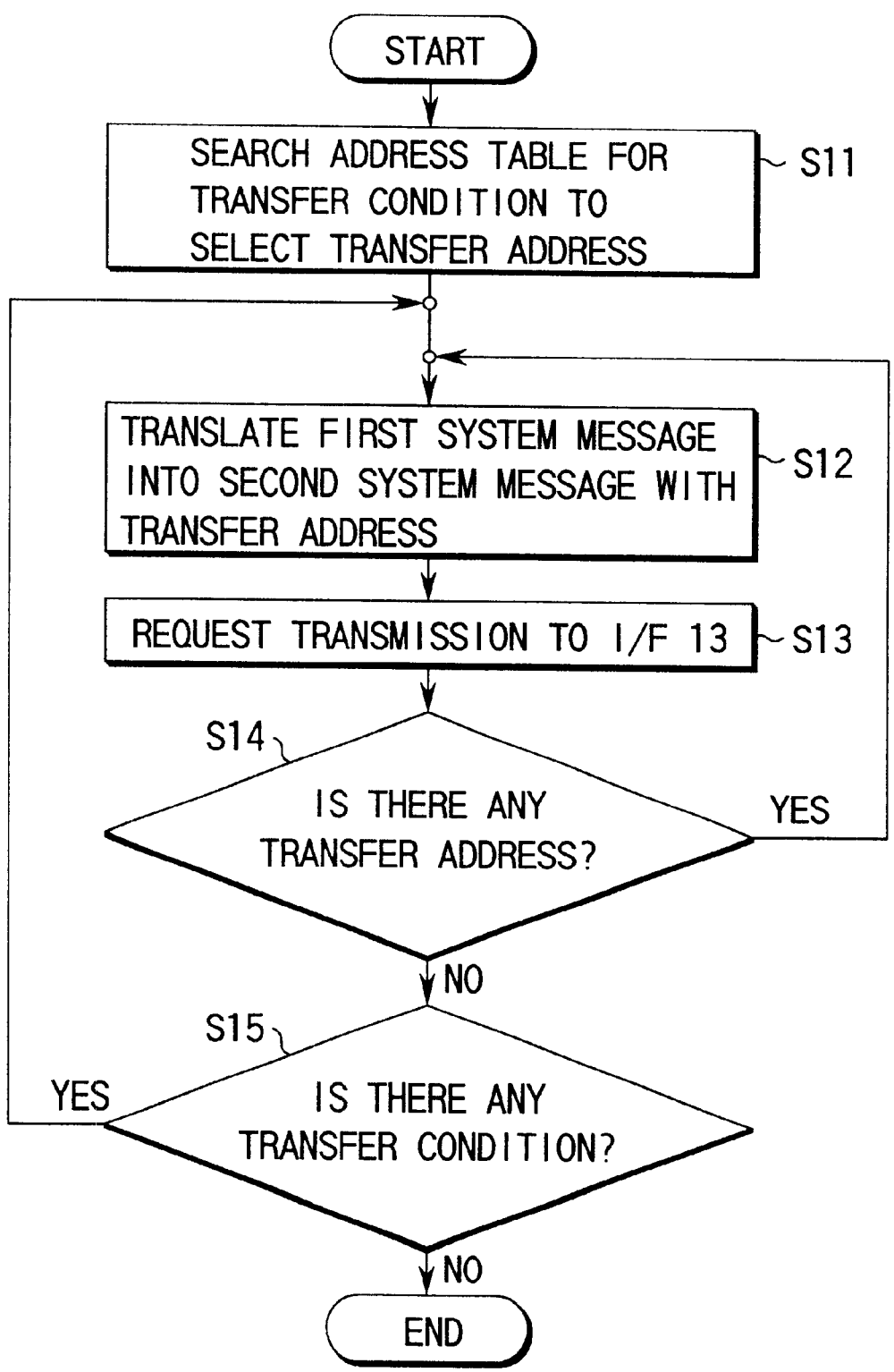
FIG. 7 is a flowchart showing the operation of a second embodiment.

The operation of the network interconnection device according to the second embodiment is explained with reference to the flowchart of FIG. 7. Assume that the first interface 11 connected to the first network NET1 has received a message with the destination address "205" and the source address "1574". The first interface 11 delivers it to the address converter 12.

The address converter 12 searches the transfer address table 14 shown in FIG. 6 for the transfer condition associated with the message in step S11. In this example, the transfer condition with vacant destination address and data contents and the source address "574", meets the requirement.

Thus, the transfer address "136.22.7" corresponding to that field including the source address "574" is determined as a transfer address. In step S12, the address converter 12 processes the original message and creates a message for the second network NET2 with "136.22.7" as the destination address. In step S13, this message, together with a transmission request, is delivered to the second interface 13 connected to the second network NET2.

The second interface 13 that has received this message sends the received message to the second network NET2.

In step S14, the address converter 12 determines whether or not there still remains a transfer address not selected. In the presence of such a transfer address, the process returns to step S12, the process described above is repeated. In the absence of such a transfer address, on the other hand, address converter 12 determines in step S15 whether there still remains a transfer condition meeting the requirement of the message. In the presence of such a transfer condition, the process returns to step S12, and subsequent steps described above are repeated. In the absence of such a transfer condition, the process ends.

In the example under consideration, only one transfer address exists, and therefore the message is transferred only to the single address. Also, only one condition is met, and therefore the process ends.

In the case where the value of the $102^{nd}$ byte of the message data is "10", the condition in the fourth field of FIG.

6 is met, with the result that the transfer addresses "136.22.7" and "158.25.6" are selected.

In this way, with the network interconnection device 10) according to the second embodiment, a message can be selected and transferred based on the destination address, the source address, the contents of the message data or a combination thereof also for the nodes of the second network NET2 not corresponding to the destination addresses of the first network NET1.

Third Embodiment

Now, an explanation will be given of an embodiment in which a message is temporarily converted into an event (Java event) and processed. The event conversion permits the communication of the network of a specific type to perform various processes as an event not dependent on the network.

Figure 8:
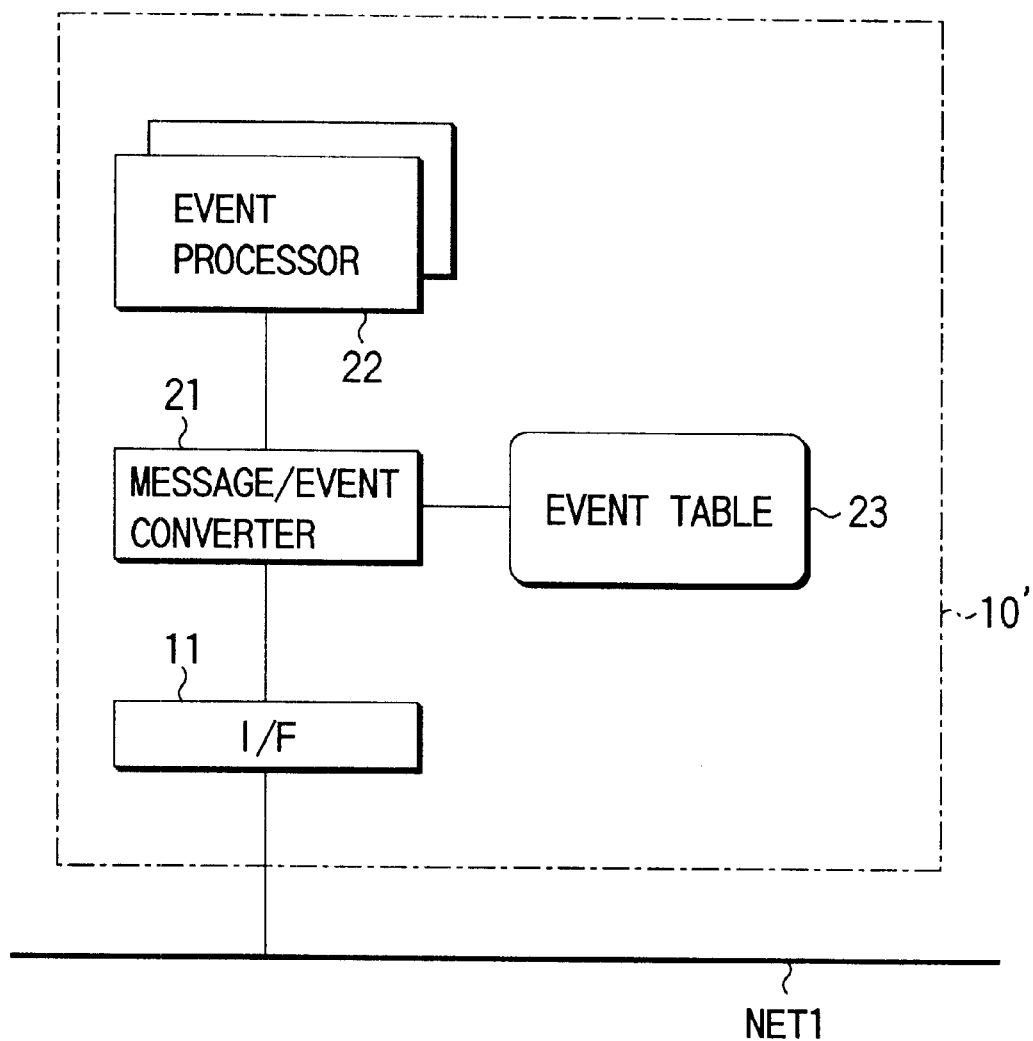
FIG. 8 is a block diagram of a network interconnection device according to a third embodiment of the invention.

An event processing device 10', as shown in FIG. 8, comprises the first interface 11, a message/event converter 21, various event processors 22 and an event table 23.

Figure 9:
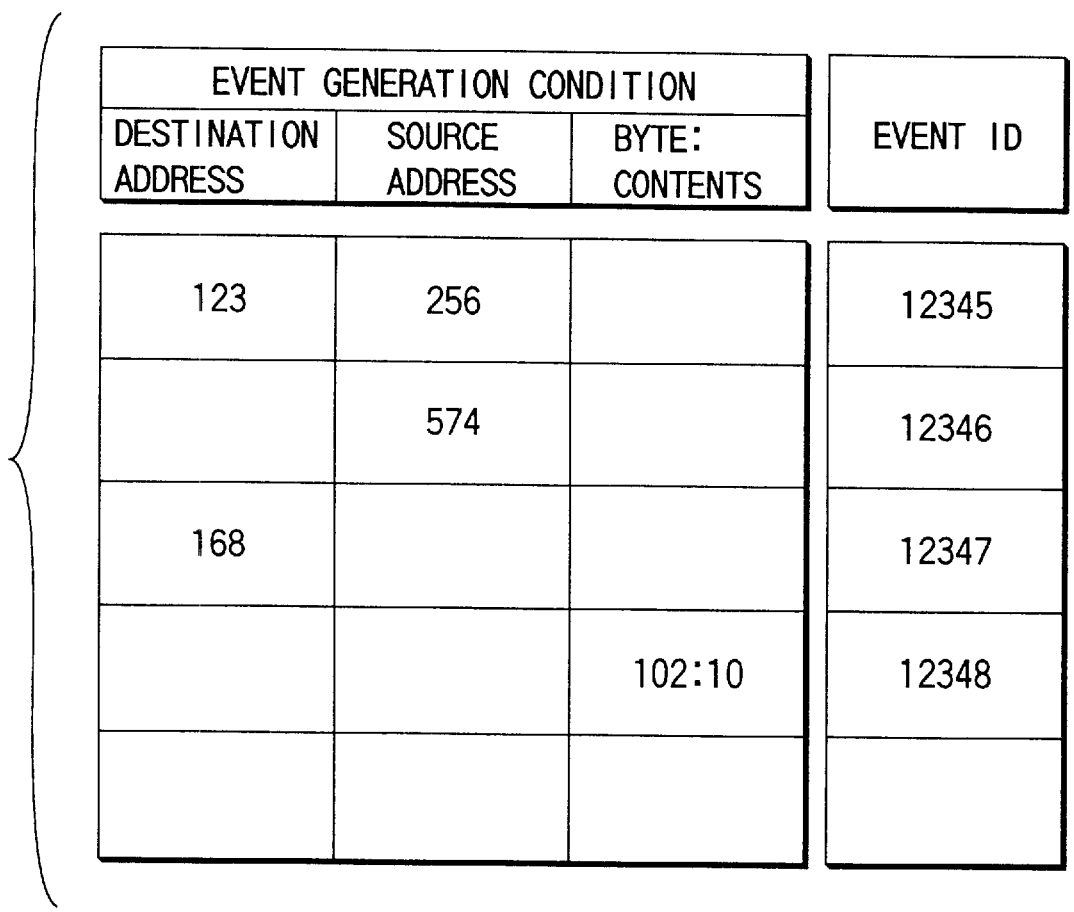
FIG. 9 shows an event table according to the third embodiment.

The first interface 11 is connected to the first network NET1 for communication, and the message/event converter 21 acquires an event ID corresponding to the conditions for event generation from the event table 23, translates or converts the message into an event in accordance with the event ID, attaches the event ID to the event, and supplies the result to the event processors 22. If the number of events used in this system is one, it is not necessary to discriminate the events by using the event ID. The various event processors 22 are prepared for each event ID for specific processing corresponding to each event ID. The event table 23, as shown in FIG. 9, has registered therein the event generation conditions and the corresponding event IDs, and is placed on a memory not shown.

Figure 10:
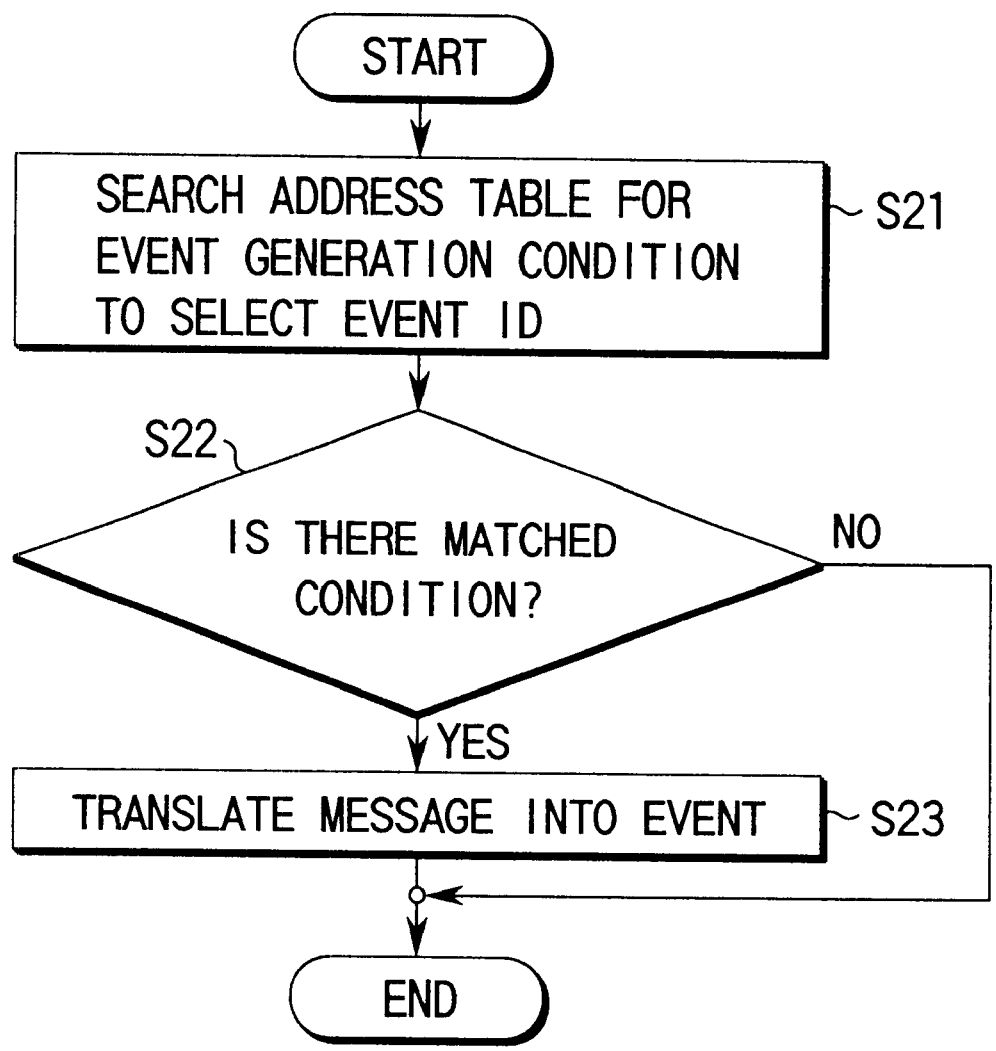
FIG. 10 is a flowchart showing the operation of the third embodiment.

The operation of the network interconnection device according to the third embodiment will be explained with reference to the flowchart of FIG. 10. Assume that the first interface 11 connected to the first network NET1 has received a message including the destination address "205" and the source address "574" from a node (address "574") in the network NET1.

The interface 11 delivers the message to the message/event converter 21. In step S21, the message/event converter 21 searches the event table of FIG. 9 for the event generation condition matched with the message and in step S22, determines whether a field is available which meets the condition.

In this example, the condition is met of the field having no destination address, no data contents but a source address "574". In step S23, therefore, the event ID "12346" of the corresponding field is delivered to the event processors 22 with the message. Specifically, the message/event converter 21 translates the message to the corresponding event and delivers it to the event processors 22 in the case where the message meets the condition. In the case where the field meeting the condition is not present in step S22, the process ends.

The event processors 22 are for processing corresponding to the type of the event ID and are prepared for each event ID to perform specific processing for the particular event.

In this way, a specific event processing corresponding to the event ID is performed, so that the communication of a network of a specific type can be variously processed in the form called an event not dependent on the type of the network.

Fourth Embodiment

Now, an explanation will be given of an embodiment of the network interconnection device with an event processing function in which a communication message of a network of a specific type can be transferred to a different type of network in a form called the event not dependent on the network type.

Figure 11:
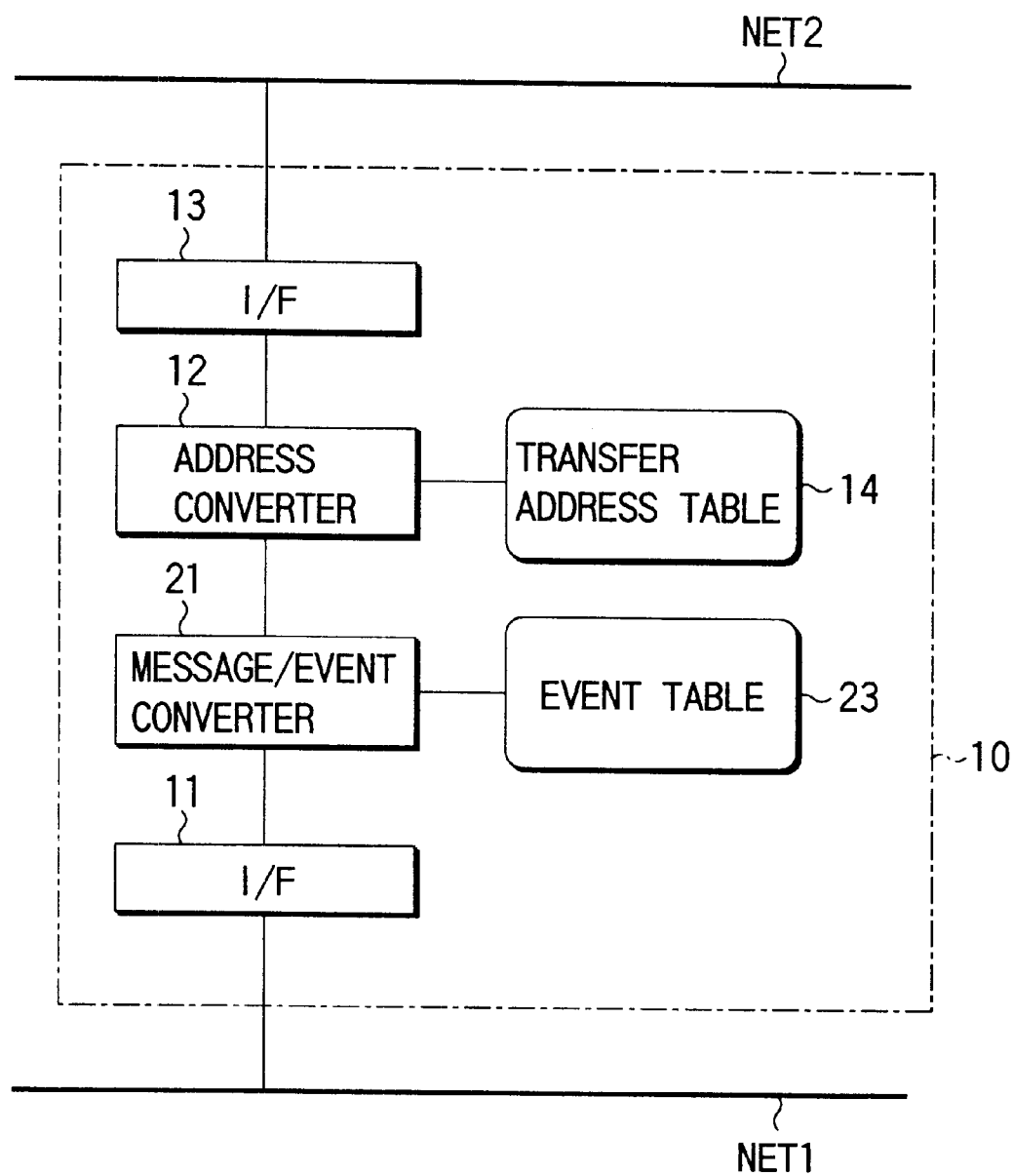
FIG. 11 is a block diagram showing a network interconnection device according to a fourth embodiment of the invention.

A network interconnection device according to the fourth embodiment is configured as shown in FIG. 11.

The network interconnection device 10 comprises the first interface 11, the message/event converter 21, the address converter 12, the event table 23, the transfer address table 14 and the second interface 13.

The first interface 11 is connected to the first network NET1 for communication. The second interface 13 is connected to the second network NET2 for communication. The message/event converter 21 acquires from the event table 23 an event ID corresponding to the event generation condition contained in the message delivered from the interface 11, converts the message into an event, and supplies the event to the address converter 12 with an event ID. The address converter 12 has the function of processing an event and performs a processing unique to each event ID (in this case, address conversion processing and event sending processing).

The event table 23 is a table in which the event generation conditions and the event IDs corresponding to the conditions are registered as shown in FIG. 9. The transfer address table 14 has registered therein the transfer conditions and corresponding addresses as shown in FIG. 6 (in which the transfer conditions are expressed by a message unlike in the present embodiment in which they are expressed by an event). These tables 23 and 14 are placed on a memory not shown.

The operation of the network interconnection device according to the fourth embodiment will be explained. Assume that the interface 11 connected to the first network NET1 has received a message with the data of a destination address 1120511 and a source address "574" from a node (having an address "574") in the network NET1.

The interface 11 delivers the message to the message/event converter 21. The message/event converter 21, like in the third embodiment, converts the message into an event. This event is delivered to the address converter 12 together with an event ID. As a result, the address converter 12 according to the fourth embodiment shown in FIG. 11 is regarded as one of the various event processing sections according to the third embodiment shown in FIG. 8.

The address converter 12, like the message processing section 12 of the first or second embodiment, searches the transfer address table 14 having the contents shown in FIG. 4 or 6 for a field corresponding to the address of the particular event or the transfer condition corresponding to the particular event. The difference of this embodiment, however, lies in that the message is delivered in the form of an event and that the destination address, the source address and the message are all delivered in the form of event data. The transfer address table 14, which has the contents as shown in FIG. 6 (the transfer address is determined by a combination of a plurality of parameters) in the following embodiments, may have the contents as shown in FIG. 4 (the transfer address is determined only from the destination address).

As in the second embodiment, the address "136.22.7" is selected as a transfer address. In order to transmit the event to the transfer address, the address converter 12 prepares a message for the second network NET2 with this address "136.22.7", and sends it together with a transmission request to the second interface 13 connected to the second network NET2. As a result, the interface 13 sends the message received from the address converter 12 to the second network NET2.

In this way, a communication message of a network of a specific type can be sent to a network of a different type in the form of an event not dependent on the network type. In the destination network interconnection device, the event is converted into the message and processes accordingly.

Fifth Embodiment

In the fourth embodiment, the transfer address is determined by delivering the destination address, the source address and the data position/contents indicating the transfer condition as an event to the address converter 12. An explanation will be made of the fifth embodiment, in which only an event ID is delivered to the address converter 12 but not the contents of the transfer condition for determining the transfer address. The configuration of the fifth embodiment is similar to that of the fourth embodiment shown in FIG. 11 and will not be described.

The operation of the network interconnection device according to the fifth embodiment will be explained with reference to the flowchart of FIG. 12. Assume that the interface 11 connected to the first network NET1 has received a message of the destination address "205" and the source address "574" from a given node (with address "574") of the network NET1.

The interface 11 delivers the message to the message/event converter 21. The message/event converter 21, like in the third embodiment, converts it into an event and together with an event ID "12346", delivers it to the address converter 12 of FIG. 11.

Figure 12:
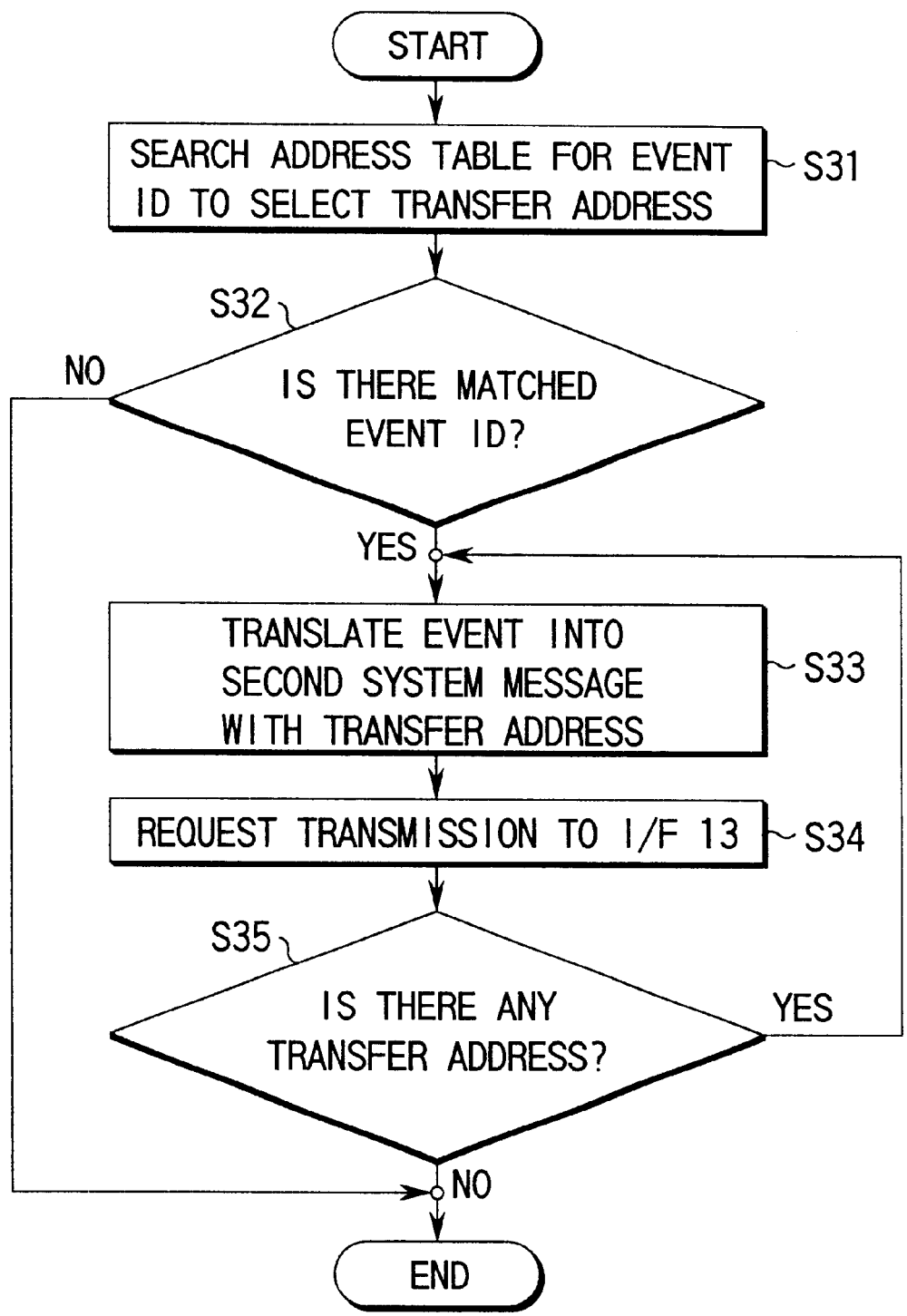
FIG. 12 is a flowchart showing the operation of a network interconnection device according to a fifth embodiment of the invention.
Figure 13:
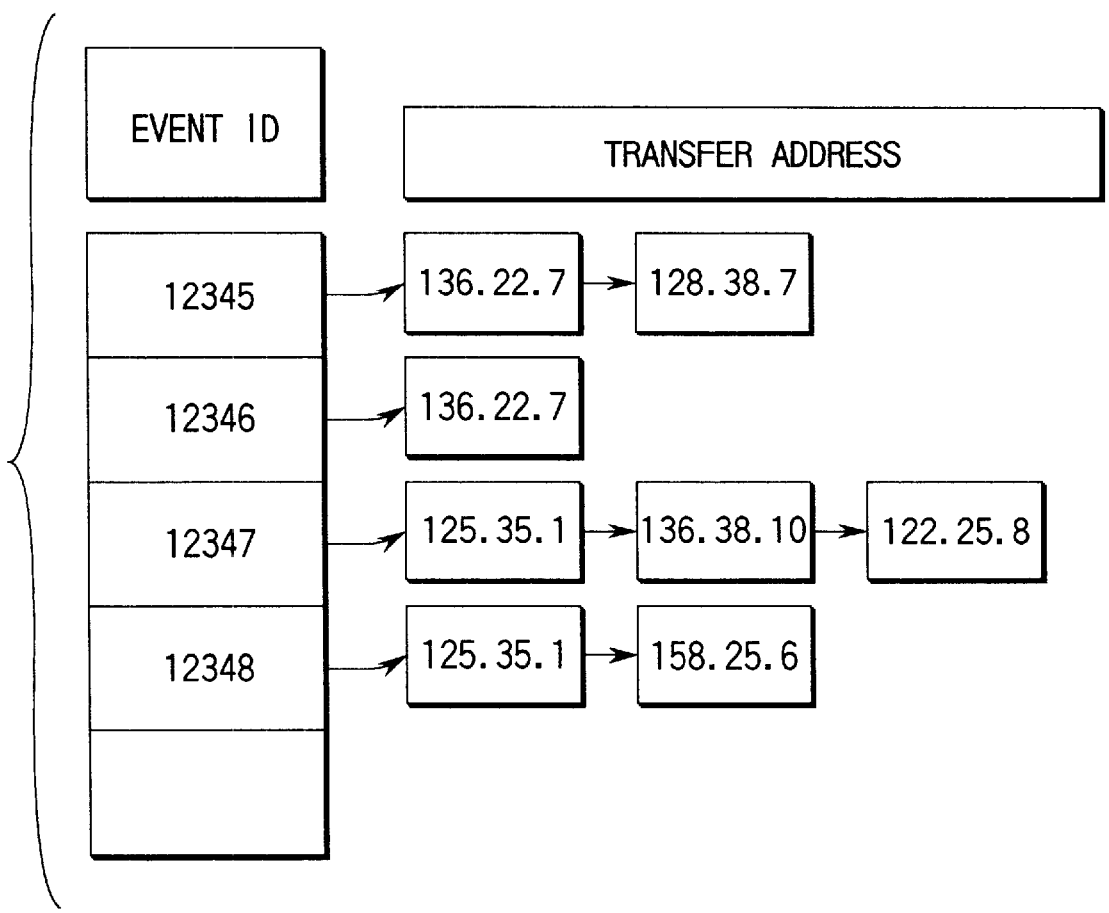
FIG. 13 shows an event table according to the fifth embodiment.

The address converter 12, according to the flow shown in FIG. 12, searches the address table of FIG. 13 for a field corresponding to the event ID attached to the event in step S31. Step S32 determines for the presence or absence of the field associated with the event ID, and in the absence of such a field, ends the process. While in the presence of such a field, produces a message to the network address of the corresponding second network to which the message has not yet been sent. Specifically, the address "136.22.7" is attached to the event. In step S34, the message thus produced, with a transmission request, is sent to the interface 13 connected to the second network. As a result, the interface 13 sends the same message to the second network NET2.

Upon complete transmission of the event to the second network NET2 through the interface 13, step S35 determines again whether there still remains a corresponding transfer address, and in the absence of such a transfer address, ends the process. Otherwise, the steps including and subsequent to step S33 are repeated.

Specifically, upon receipt of a message of the destination address "205" and the source address "574", the interface 11 delivers them to the message/event converter 21. The message/event converter 21 converts the message into an event of event ID "12346" with reference to the event table 23, and delivers the event to the address converter 12. The address converter 12 searches the address table 14 of FIG. 13 for a field corresponding to the event ID (step S31 in FIG. 12). It is determined whether or not a field corresponding to the event ID (step S32 in FIG. 12). In the absence of such a field, the process ends. While in the presence of such a field, a message for the corresponding transfer address of the second network is produced (step S33 in FIG. 12).

In this example, a corresponding field exists, and therefore a message is produced for the address "136.22.7" described in the transfer address list.

A transmission request is sent to the interface 13 connected to the second network NET2 and the message is sent to the second network NET2.

In this example, only one transfer address exists, and therefore the message is transferred only to one destination.

Although the result of execution is similar to that for the fourth embodiment, the fifth embodiment is such that the address converter 12 is not required to determine the contents of the event data but the event ID. Thus, the processing speed is remarkably increased.

Sixth Embodiment

Figure 14:
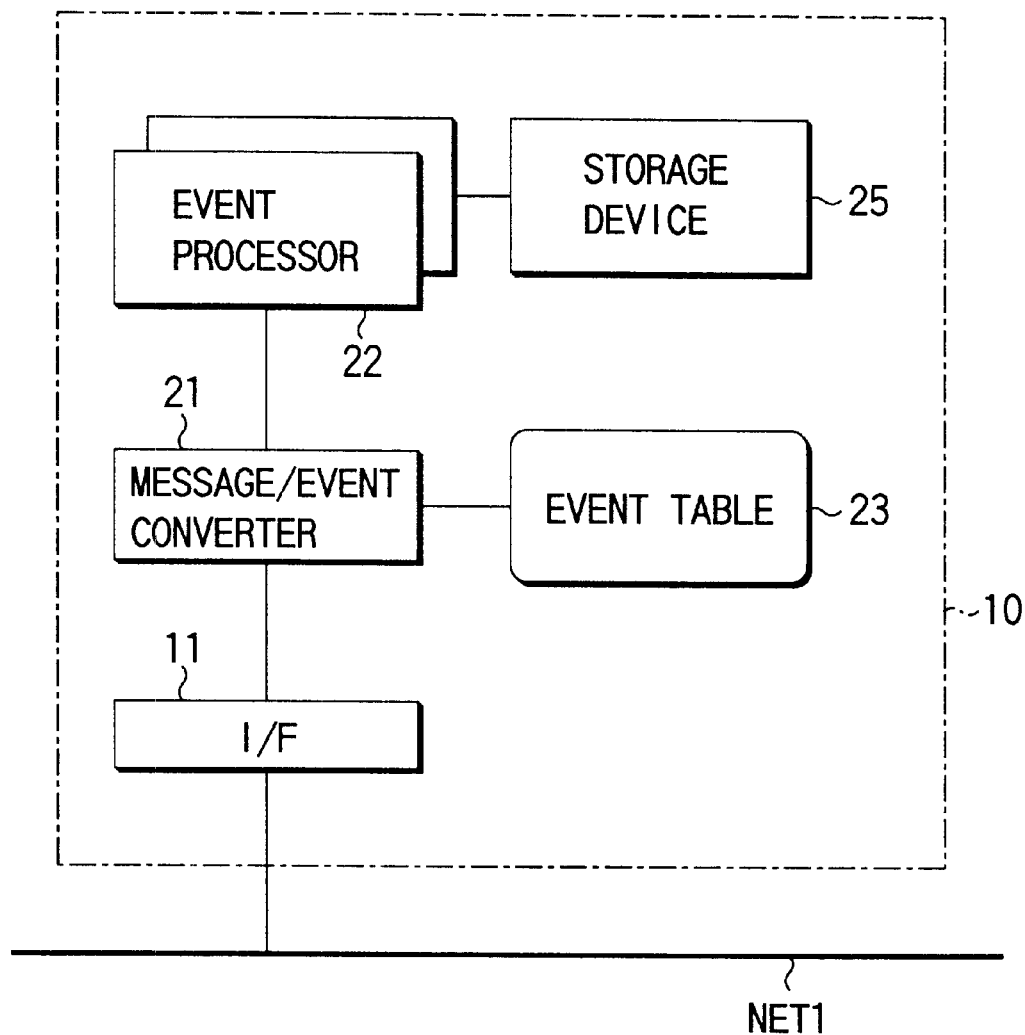
FIG. 14 is a block diagram showing a network interconnection device according to a sixth embodiment of the invention.

A sixth embodiment is shown in FIG. 14. The sixth embodiment is capable of recording the received message in the form of an event not dependent on the network type. An event is not sent to the second network once each time a message is received the first network, but several events for a plurality of messages received several times can be collectively sent at a time. This embodiment thus can accommodate the difference of the characteristics such as the communication speed of the first and second networks.

A network interconnection device according to this embodiment has a similar configuration to the third embodiment shown in FIG. 8, but is different in that a storage device 25 is connected to the event processors 22.

According to this embodiment, the message from the first network NET1 is received by the interface 11 and converted into an event by the message/event converter 21. The resulting event is delivered to the event processors 22 together with an event ID as in the third embodiment. The feature of this embodiment, however, lies in that the corresponding event processors 22 records the type and the time of generation of an event in the storage device 25. This recording operation is performed independently regardless of whether the event processors 22 transfer the event to the first network NET1. The provision of the event processors 22 permits an event in a form not dependent on the network type to be recorded in the storage device 25.

As a, result, a message can be sent to the second network not each time it is received from the first network but a plurality of messages collectively once every several receipts, thus absorbing the difference in characteristics such as the speed between the first and second networks.

Seventh Embodiment

Now, an explanation will be given of a seventh embodiment capable of avoiding the waste of sending a message to a network which has developed a malfunction or has a power failure.

Figure 15:
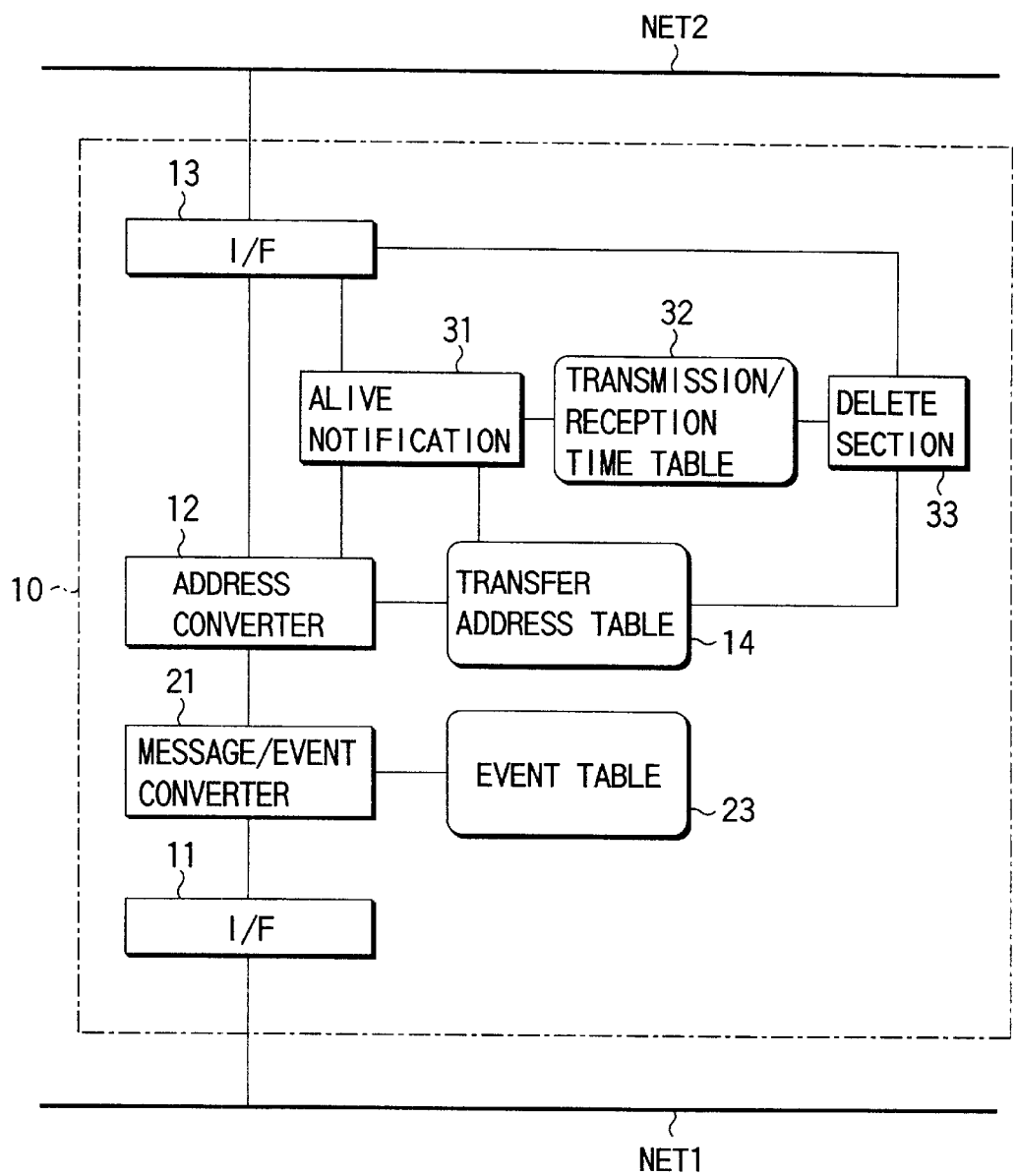
FIG. 15 is a block diagram showing a network interconnection device according to a seventh embodiment of the invention.

FIG. 15 shows a configuration of the seventh embodiment.

The network interconnection device according to this embodiment comprises the first interface 11, the message/event converter 21, the address converter 12, the second interface 13, the transfer address table 14, and the event table 23. The device further comprises an alive notification section 31 for determining whether a given network interconnection device is qualified in participating in the communication or informing the other network interconnection devices that it is capable of communication, a last transmission/reception time table 32 and a delete section 33.

Figures 16, 17:
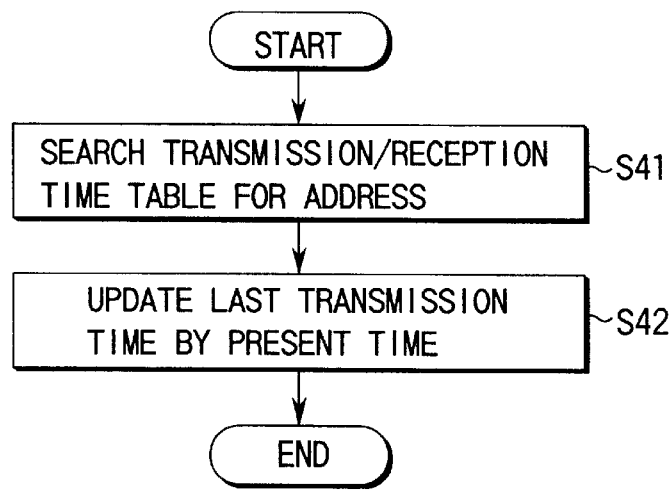
FIG. 16 shows a last transmission and reception time table according to the seventh embodiment.
FIG. 17 is a flowchart showing the operation of the alive notification section according to the seventh embodiment.

The last transmission/reception time table 32 is configured, for example, as shown in FIG. 16, which has registered therein the addresses of the network interconnection devices 10, the last transmission time data when other devices transmitted a message to the device 10 and the last reception time data when the device received a message from other devices. The time data is capable of being updated.

The message of the first network NET1 is received by the interface 11 for the first type, delivered to the message/event converter 21, and after being appropriately processed there, supplied to the address converter 12 in the same manner as in the fourth embodiment.

According to this embodiment, however, a transmission request to the second network NET2, which is delivered by the address converter 12 to the interface 13 for the second type, is also sent to the alive notification section 31 at the same time. The alive notification section searches the last transmission/reception time table 32 in accordance with the flow of the process shown in FIG. 17 for a field corresponding to the address of the second network NET2 (step S41), and updates the last transmission time to the present time (step S42).

Figure 18:
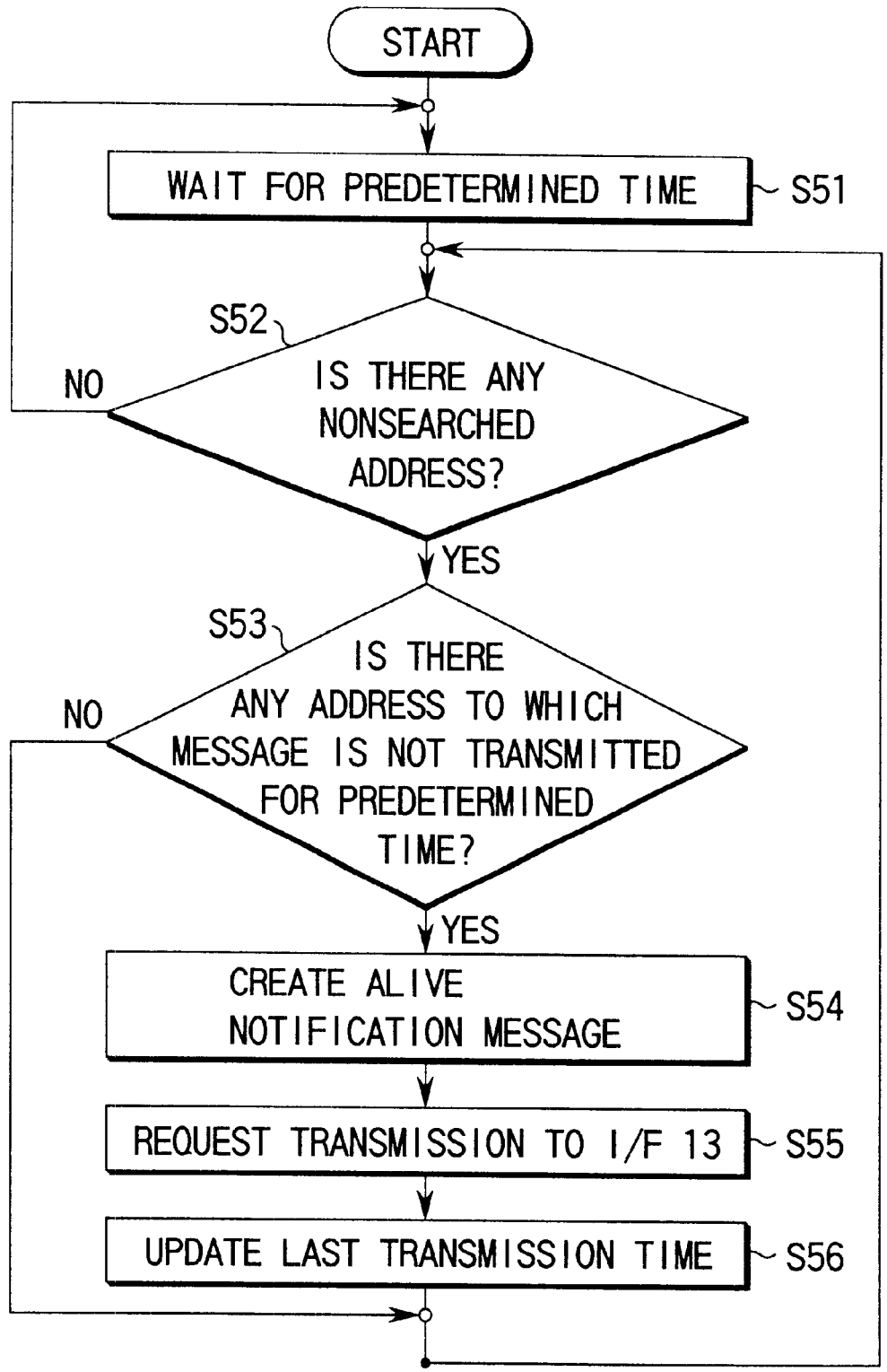
FIG. 18 is a flowchart showing the background operation of the alive notification section according to the seventh embodiment.

In this case, the alive notification section 31 operates always in accordance with the flow of the processing shown in FIG. 18.

Specifically, the alive notification section 31, as shown in steps S51, S52, searches the last transmission/reception time table 32 configured as shown in FIG. 16 at predetermined time intervals, and in step S53 searches for another network interconnection device 10 connected to the second network NET2 that has elapsed a predetermined length of time from the last transmission thereto. In step S54, an alive notification message is produced for the network interconnection device 10 in the second network NET2 to which a message has not been sent for a predetermined length of time. In step S55, this message is sent to the second interface 13 while at the same time issuing a transmission request to the interface 13.

In response to this request, the interface 13 sends an alive notification message to the network interconnection device 10.

Further, in step S56, the alive notification section 31 updates to the present time, in the last transmission/ reception time table 32, the last transmission time corresponding to the destination address of the network interconnection device 10 to which the alive notification message is sent.

In this way, an alive notification message is sent to the nodes that have elapsed a predetermined length of time from the last transmission, and after sending the alive notification message, updates the last transmission time.

Assume, for example, that the present time is "15:11:00", the time on the last transmission/reception time table has reached the value of FIG. 16 and that the value one minute is employed as the predetermined length of time. Then, after the alive notification message is sent to the network interconnection devices of addresses "136.25.43" and "135.24.59", the items of the last transmission time in the two fields of the last transmission/reception time table 32 are both updated to "15.11.00".

Figure 19:
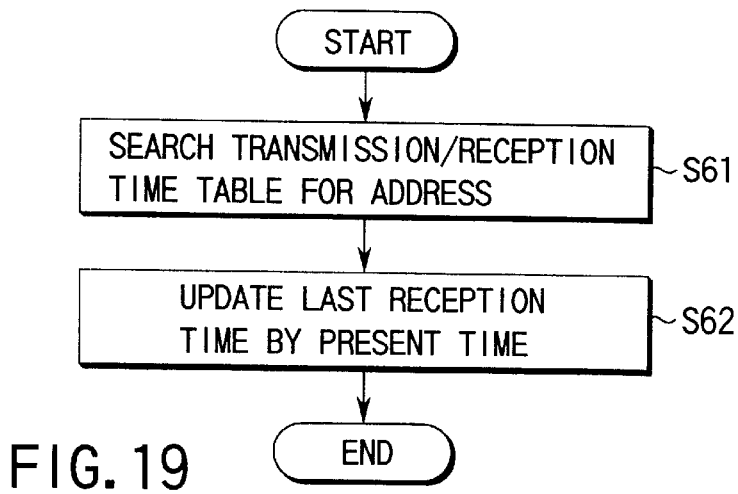
FIG. 19 is a flowchart showing the operation of the delete section according to the seventh embodiment.

The interface 13 connected to the second network NET2 that has received these messages from the second network NET2, on the other hand, delivers the received message also to the delete section 33 of FIG. 15. The delete section 33 that has received this message searches the last transmission/ reception time table 32 of FIG. 16 for a field corresponding to the source address of the second network NET2 (step S61) along the flow of the process shown in FIG. 19, and updates the last reception time in the field to the present time (step S62).

Figure 20:
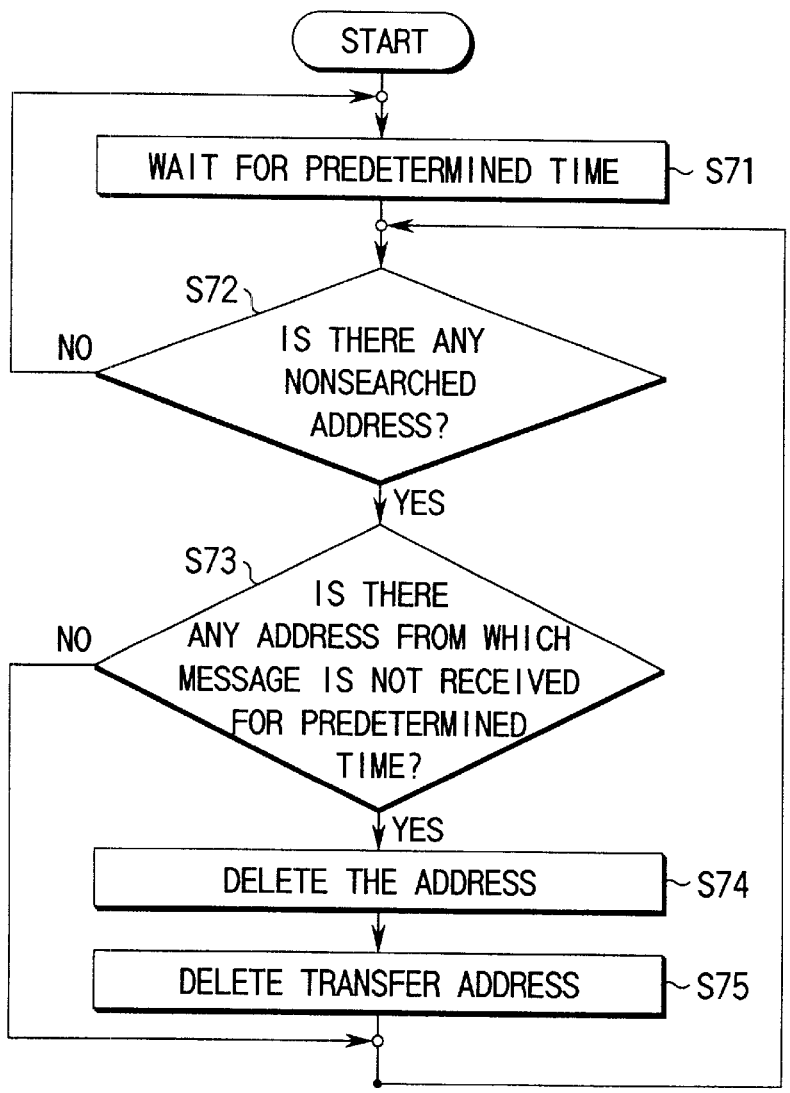
FIG. 20 is a flowchart showing the background operation of the delete section according to the seventh embodiment.

In the process, the delete section 33 always operates according to the flow of the process shown in FIG. 20. Specifically, the delete section 33, as shown in steps S71, S72, searches the last transmission/reception time table 32 of FIG. 16 at predetermined time intervals to check for any field not yet searched for the present time in which the address of the network interconnection device is written in the last transmission/reception time table 32. In steps S73, S74, the field corresponding to the address of other network interconnection devices with the event processing function that have elapsed a predetermined length of time after the last reception is deleted from the last transmission/reception time table 32. In step S75, the particular address thus deleted from the last transmission/reception time table 32 is deleted from the transfer addresses in the address table 14 of FIG. 13.

According to this embodiment, the value of two minutes is set as the predetermined length of time. Assuming that the present time is "15.11.00", and that the event processing unit having the address "125.35.1" runs out of order or the network is disconnected, for example, the last transmission/ reception time tale 32 has the values as shown in FIG. 16. The transfer address table 14 is assumed to have the values as shown in FIG. 13.

Figure 22:
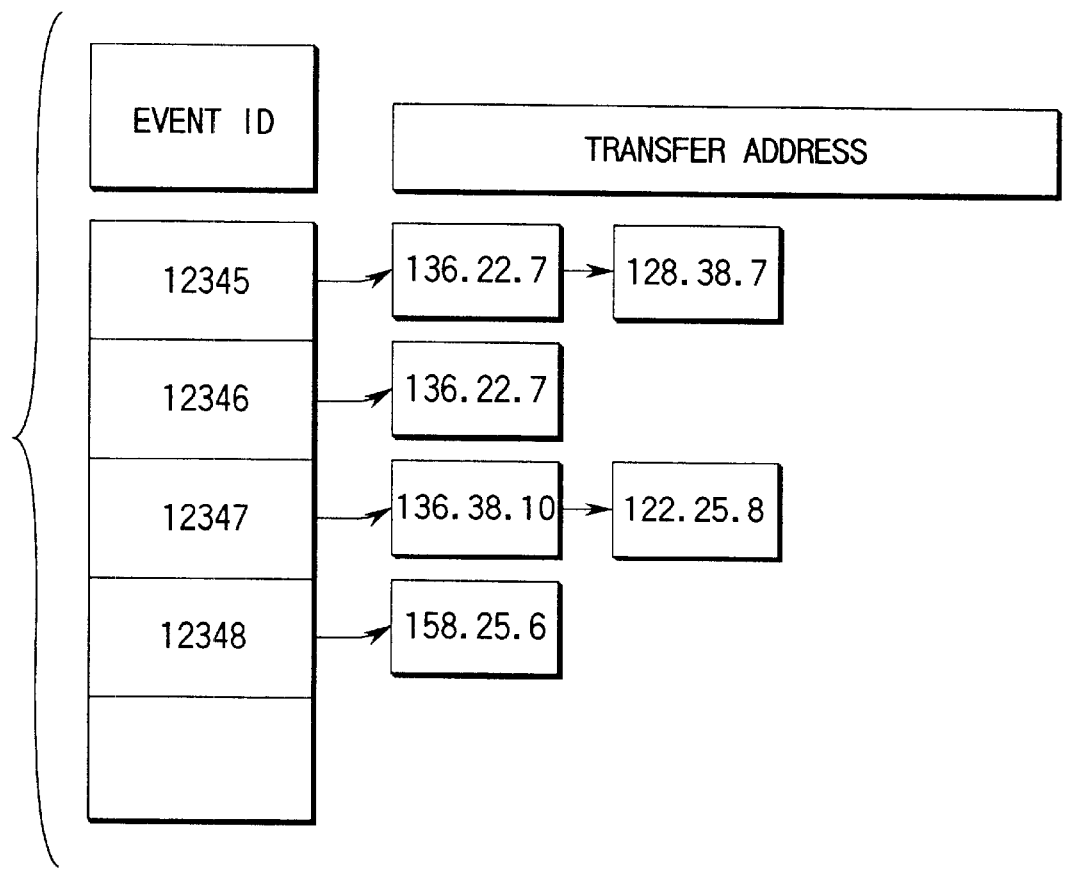
FIG. 22 shows contents of the transfer address table after the delete operation according to the seventh embodiment.

In this case, the above-mentioned processing deletes the field of address "125.35.1" of the network interconnection device with the event processing function in the last transmission/reception time table 32 of FIG. 16. At the same time, the item of the address "125.35.1" is deleted from the transfer address list of FIG. 13. As a result, the last transmission/reception time table 32 is updated as shown in FIG. 21, and the transfer address table 14 is updated as shown in FIG. 22.

According to the seventh embodiment, any message is not sent to the address "125.35.1" in the future, and therefore the wasteful transmission is avoided for an improved efficiency of the network interconnection device with an event processing unit, while at the same time reducing the load on the network.

Eighth Embodiment

Now, an eighth embodiment will be explained, in which the new participation of a network interconnection device or the re-participation of the device in a system after a fault has been repaired is recognized and the particular device allowed to take part in the communication.

Figure 23:
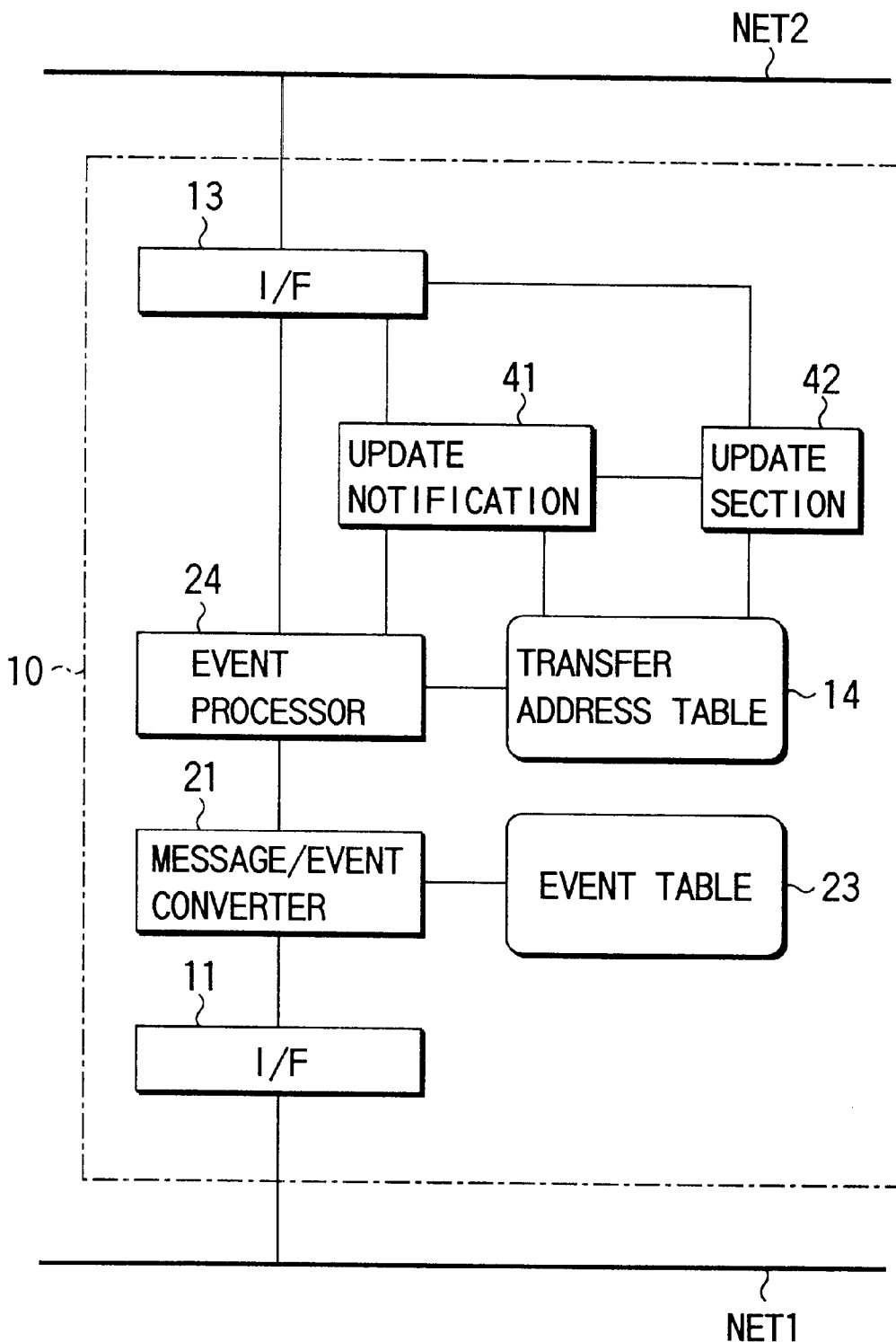
FIG. 23 is a block diagram showing a network interconnection device according to an eighth embodiment of the invention.

FIG. 23 shows a configuration of the eighth embodiment. This network interconnection device comprises the first interface 11, the message/event converter 21, the address converter 12, the second interface 13, the transfer address table 14, and the event table 23. The device further comprises an update notification section 41 for determining the possibility of each network interconnection device to participate in the communication and informing other network interconnection devices of the updating of the connection state and notifying that a network interconnection device is ready for participating in the communication, and an update section 42 for updating the contents of the transfer address table 14 in accordance with the notification from the update notification section 41.

According to this embodiment, by way of explanation, assume that a given network interconnection device 10 is newly connected to the second network NET2 or has restored from a fault and is reconnected to the second network NET2.

Figure 24:
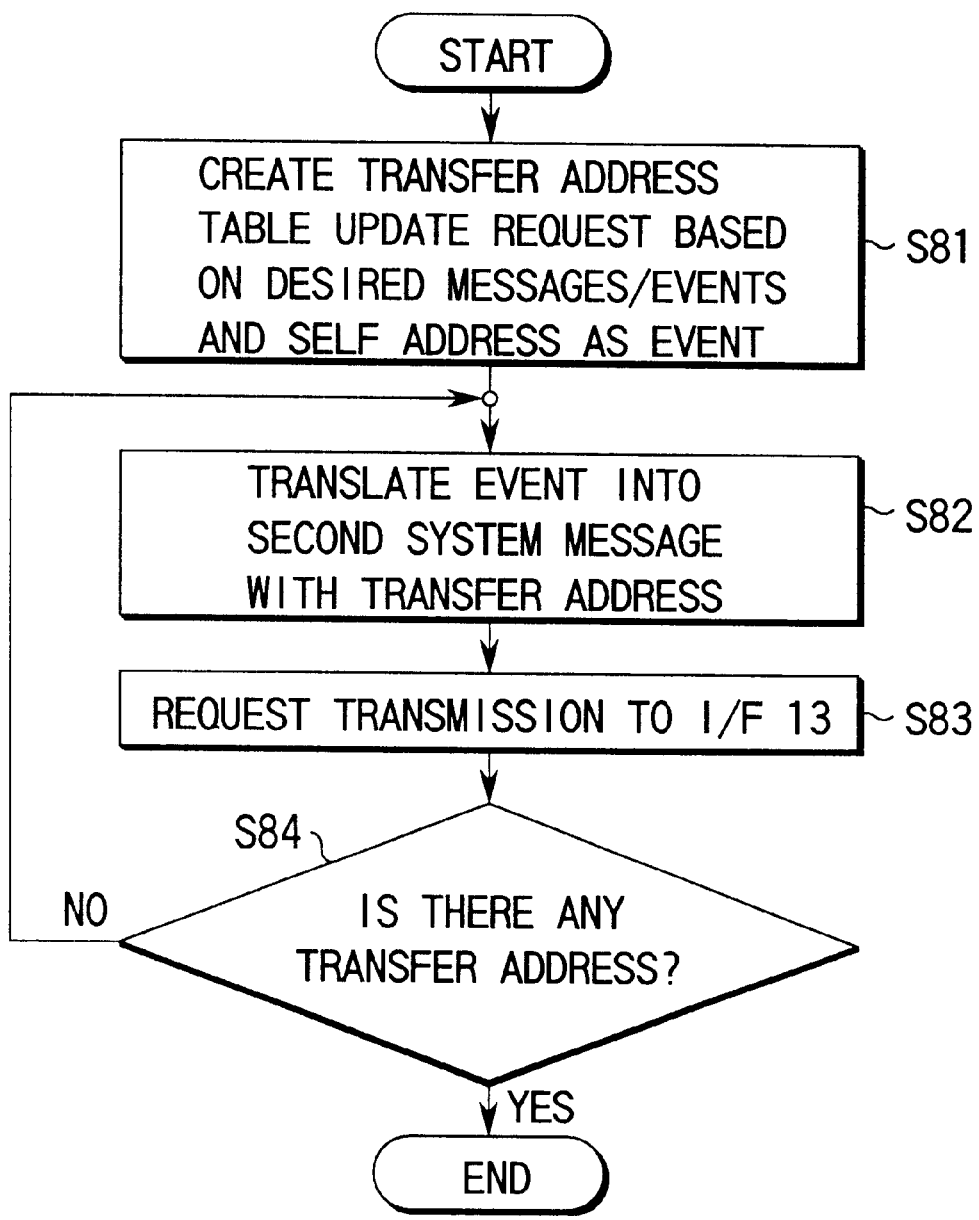
FIG. 24 is a flowchart showing the update request operation of the update notification section according to the eighth embodiment.

When an arbitrary network interconnection device 10 is newly connected to the second network NET2, as shown in step S81 (FIG. 24), the update notification section 41 of the network interconnection device 10 produces as an event an address table update request. The address table update request indicates a message or messages which are desired to be transferred to the newly connected device 10 and comprises its own address and the condition for the event or the message desired to be sent to its device and the address thereof.

In step S82, this event is produced as a message for other network interconnection devices 10, followed by step S83 in which it is sent to the interface 13 of the second network NET2 together with a transmission request.

This process is repeated until the event is sent to all the other network interconnection devices (step S84).

In this way, the message and the event conditions desired to be sent to the network interconnection device, together with the address of the device in the second network, are sent as a set to all the other network interconnection devices in the form of an update request.

On the other hand, each interface 13 of the other network interconnection devices that have received the update request delivers the request to the update section 4.2. The update section 42 updates the transfer address table 14 in accordance with the process flow of FIG. 25. Specifically, in step S91, the update section 42 determines whether a field having the same conditions as those of the update request is included in the transfer address table 14 (the transfer address table 14 according to this embodiment is shown in FIGS. 3, 6, etc.). In the presence of such conditions, the address of the network interconnection device of the update request source is added to the field of the transfer address table 14 in step S92. In the absence of a field having the same conditions as the update request in the transfer address table 14, on the other hand, the conditions included in the update request are added to the condition items by adding a new field in the transfer address table 14 in step S93, and the address of the source network interconnection device is added to the transfer address list.

Specifically, with the contents of the transfer address table 14 as a key to the event type (event ID), specific addresses constituting the transfer addresses are registered as a transfer address list. Assume that the contents of the transfer address table 14 are as shown in FIG. 22 and the data as shown in FIG. 26 are received as an update request. As a result of the processing at the update section 42 that has received the request, the contents registered in the transfer address table 14 become as shown in FIG. 13. In other words, "125.35.1" is added to the transfer address lists corresponding to the event IDs "12347" and "12348".

As described above, according to this embodiment, even in the case where the network interconnection device with an event processor is newly connected to a network or reconnected after restoration from a fault, the transfer address table 14 of the other network interconnection devices with the event processor are automatically updated. Thus, the required message event transfer is carried out positively.

Ninth Embodiment

The configuration of the ninth embodiment is similar to that of the eighth embodiment shown in FIG. 23. In the eighth embodiment, a network interconnection device desirous of issuing an update request sends it to all the other interconnection devices. For this to be done, a newly-participating network interconnection device is required to know the addresses of all the other interconnection devices. This is difficult as a matter of fact. For this reason, according to the ninth embodiment, an interconnection device desiring to issue an update request issues an update request only to a predetermined interconnection device which knows the addresses of all the other interconnection devices. The predetermined network interconnection device transfers an update request to all the addresses of the transfer destinations listed in its transfer address table.

As a result, the network interconnection device newly connected or reconnected after a fault can transmit an update request to all the other event processing units simply by sending an update request only to one of the network interconnection devices which knows the addresses of all the other interconnection devices.

Consequently, a newly-connected or reconnected network interconnection device can cause all the network interconnection devices to recognize the interconnection of its device simply by being conscious of the address of the network interconnection devices which knows the addresses of all the other interconnection devices (for example, a interconnection device connected to an intelligent terminal of a management center which is often known to all the persons working with the system).

As described above, according to this invention, a message of the first-type network can be received by a plurality of nodes of the first-type network through a network of a different type, or received by a plurality of nodes of a network of a different type. Further, even in the case where a network interconnection device of the second-type network runs out of order, is disconnected or newly or repetitively connected, the network matching can be operatively maintained by updating the transfer address table of each of these network interconnection devices according to the prevailing situation.

Also, in order to transfer a message to a designated node other than the original destination node, assuming that the pair of the source address and the destination address or a part of the contents of the message meet specific conditions, the message is transferred to a designated address set. Another feature is that in order for a message to be received by a node within a network of a different type, the message is converted into the form called an event before being sent.

According to the present invention, there is provided a, network interconnection device used in a network system including at least two types of networks of different types for transferring a message according to the destination data of the message, comprising transmission means including a table for storing a second address constituting a transfer address corresponding to a first address constituting a destination address of the message, wherein upon receipt of a message to a first address, the message is transferred to a second address corresponding to the specific first address with reference to the table, and wherein the table permits each of the first addresses to correspond to a plurality of the second addresses.

With this configuration, an address table for changing the addresses is prepared in which a plurality of transfer addresses are registered in advance, whereby a message which has originally a single destination can be transferred to a plurality of different locations registered in the table (address table).

According to the present invention, there is provided a network interconnection device used in a network system including at least two different types of networks for transferring a message according to the destination address of a message, comprising transmission means including a table for storing a second address constituting the transfer destination address corresponding to a first address constituting the destination address of the message, which table is adapted to store the correspondence between a message received with at least one of a first destination address, a source address and a part of the content of the message as a key and at least one second address, wherein upon receipt of a message, the corresponding second address is determined with reference to the table and the message is sent to the particular address.

With this configuration, a message can be retrieved and sent even to a node of the second-type network not corresponding to the destination of the first-type network with an appropriate destination address, a source address and the content of the message data or a combination thereof.

According to the present invention, there is provided a network interconnection device used in a network system including at least two types of networks of different type for transferring a message according to the destination data of the message, comprising event conversion means for converting a communication message received thereby into an event, and event processing means for activating the corresponding processing upon receipt of an event.

With this configuration, a specific processing is executed in accordance with an event, and therefore the communication of a network of a specific type can be variously processed by converting it into a form called an event not dependent on the network type.

The network interconnection device further comprises a table for storing the correspondence between a key comprised of at least one of a first destination address, a source address and a part of the content of the message readable from an event on the one hand and at least one second address on the other hand, wherein the activation process is to transmit an event to a corresponding second address with reference to the table.

With, this configuration, the communication message of the network of a specific type can be sent to a network of a different type in the form of an event not dependent on the network type.

According to the present invention, there is provided a network interconnection device with an event processing function for activating a corresponding process upon receipt of an event, comprising a table for storing a conversion correspondence between a received message and an event type, and event conversion means for converting the communication message received into a corresponding event type with reference to the table.

With this configuration, a specific received message can be recorded in the form called an event not dependent on the network type. For example, several sessions of events can be sent to the second-type network at a time for each several sessions of receiving from the first-type network, thus making it possible to accommodate the difference in characteristics such as the network speed.

The network interconnection device further comprises a table for storing the correspondence between a key comprised of at least selected one of a destination address, a source address and a part of the contents of the message on the one hand and the event type into which the message is converted on the other hand.

With this configuration, a specific message received can be recorded in a form called an event not dependent on the network type. For example, several sessions of events can be collectively sent for each several sessions of receiving from the first-type network to the second-type network, thereby making it possible to accommodate the difference in the characteristics such as the speed of the network.

The network interconnection device further comprising transmission means including a table for storing the correspondence between the event type and at least one second address and means for sending an event executable by the activated process to at least one address corresponding to the event type with reference to the table.

With this configuration, the communication message of a network of a specific type can be sent to a network of a different type in a form called an event not dependent on the network type. In the process, only the event ID is determined without determining the contents of the event data, thereby remarkably improving the operating efficiency.

The network interconnection device further comprises means for storing in a storage medium, wherein the activation process records an event in the storage medium.

With this configuration, the received message can be recorded in the storage medium in a form called an event. For example, the data can be sent to the second-type network once every several sessions of receiving from the first network, thereby accommodating the difference in characteristics such as difference in communication rate between the first and second networks.

The network interconnection device further comprises an alive notification section for sending some message to the other network interconnection device in the absence of transmission to other network interconnection devices for a predetermined length of time, and a delete section for monitoring the receiving of messages and deleting the table item having as a second address the addresses of other network interconnection devices from which no message is has been sent for a predetermined length of time.

With this configuration, the address of a network interconnection device from which no message is sent for a predetermined length of time is deleted from the table, with the result that no message is subsequently sent to the deleted address. Thus, the wasteful transmission is avoided and the network interconnection device with the event processing function can be improved in efficiency, while at the same time reducing the load on the network.

The network interconnection device further comprises an update notification section for sending an update request for a table including own device as a second address to other network interconnection devices, and an update section for updating the table upon receipt of the update request.

With this configuration, even in the case where a network interconnection device is newly connected to the network or reconnected to the network after restoration from a malfunction, the table of other network interconnection devices can be automatically updated, and therefore the required message transfer never fails.

The network interconnection device further comprises means for updating a table upon receipt of a table update request and sending the request to other network interconnection devices registered in own table as a second address.

As a result, a network interconnection device newly connected or reconnected after repair of a fault can send an update request to all the other event processing units simply by sending an update request to a single network interconnection device which knows the addresses of all the other interconnection devices.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. As to the event processing in the embodiments describe above, for example, not only a message of the first network NET1 is converted into a message of the second network NET2, but also a message received through the second network NET2 is converted again into the message of the first network NET1 and sent to an appropriate node of the first network NET1.

What is claimed is:

1. A network interconnection device connected to first and second networks, comprising:
   an event table for storing an event identifier for each message communicating in said first network;
   a message/event converter for converting the message received from said first network into an event based on said event table; and
   an address converter for changing a destination address of the event which is of said first network and received from said message/event converter to an address of said second network and sending the event to said second network.

2. The network interconnection device according to claim 1, which further comprises recording means for recording a type and/or a time of generation of said event output from said message/event converter.

3. The network interconnection device according to claim 1, in which said address converter includes an address table for storing an address defined by said second network for each address of the message communicating in said first network, and in which upon receipt of an event from said message/event converter, an address is read from said address table based on the destination address of the event and a destination address of the event is changed to a read address.

4. The network interconnection device according to claim 3, which further comprises recording means for recording a type and/or a time of generation of said event output from said message/event converter.

5. A network interconnection device connected to first and second networks, comprising:
   an address table for storing an address of said second network for each event identifier;
   an event table for storing an event identifier for each message communicating in said first network;
   a message/event converter for converting a message received from said first network to an event based on said event table, said converter outputting said event with an event identifier attached thereto; and
   means for reading an address from said address table based on an event identifier upon receipt of an event from said message/event converter, and changing an address of the event into a read address.

6. The network interconnection device according to claim 5, which further comprises recording means for recording a type and/or a time of generation of said event output from said message/event converter.

7. The network interconnection device according to claim 5, in which said event table stores an event identifier for each destination address of a message communicating in said first network.

8. The network interconnection device according to claim 7, which further comprises recording means for recording a type and/or a time of generation of said event output from said message/event converter.

9. A network interconnection device according to claim 5, in which said event table stores an event identifier for selected one of the destination address, a source address and contents of the message communicating in said first network, or a combination thereof.

10. The network interconnection device according to claim 9, which further comprises recording means for recording a type and/or a time of generation of said event output from said message/event converter.

11. A network interconnection device for connecting first and second networks of a network system, comprising:
    a transfer address table for storing a transfer address defined by the second network for each message communicating in said first network;
    an address converter for changing a destination address of the message received from said first network based on said transfer address table and sending said message to said second network;
    a time table for storing, for each of other network interconnection devices, a last time point of reception at which a message was received from said other network interconnection devices and a last time point of transmission at which the message was sent to said other network interconnection devices;
    an alive notification section, based on said time table, for sending an alive notice to said other network interconnection device which did not send a message for a first time period, and updating the last time point of reception in said time table to a present time point; and
    an address table update section for detecting other network interconnection device which transmits no message for a second predetermined time length based on said time table, and deleting the transfer address corresponding to detected network interconnection device from said transfer address table.

12. The network interconnection device according to claim 11, in which said transfer address table stores a plurality of transfer addresses for each destination address of a message communicating in the first network.

13. The network interconnection device according to claim 11, in which said transfer address table stores a plurality of transfer addresses for any one of the destination address, a source address and contents of a message communicating in the first network or any combination thereof.

14. A network interconnection device for connecting first and second networks of a network system, comprising:

- a transfer address table for storing transfer address defined by the second network for each message communicating in said first network;
- an address converter for changing a destination address of a message received from said first network into the transfer address based on the transfer address table and sending the message to said second network;
- an update request section for sending an addition request to other network interconnection devices to register a pair of own address and a transfer condition indicating a desired message in the transfer address table of the other network interconnection devices; and
- an update section for adding the addresses of other network interconnection devices to said transfer address table upon receipt of the addition request from said other network interconnection devices.

15. The network interconnection device according to claim 14, in which said update request section sends an addition request to all the network interconnection devices connected to the second network.

16. The network interconnection device according to claim 14, in which said update request section sends an addition request to a predetermined network interconnection device, and in which said update section, upon receipt of the addition request, adds an address of the other network interconnection devices to said transfer address table and transfers the addition request to all of said network interconnection devices included in said transfer address table.

17. The network interconnection device according to claim 14, in which said transfer address table stores a plurality of transfer addresses for each destination address of a message communicating in the first network.

18. The network interconnection device according to claim 14, in which said transfer address table stores a plurality of transfer addresses for any one of the destination address, a source address and contents of a message communicating in the first network or any combination thereof.

* * * * *